(12) United States Patent
Preston et al.

(10) Patent No.: US 11,117,192 B2
(45) Date of Patent: Sep. 14, 2021

(54) SYSTEMS AND METHODS FOR CALIBRATION FEEDBACK FOR ADDITIVE MANUFACTURING

(71) Applicant: Desktop Metal, Inc., Burlington, MA (US)

(72) Inventors: Aaron Preston, Arlington, MA (US); Nicholas Mykulowycz, Boxford, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/508,882

(22) Filed: Jul. 11, 2019

(65) Prior Publication Data

US 2019/0329322 A1    Oct. 31, 2019

Related U.S. Application Data

(63) Continuation of application No. 15/487,909, filed on Apr. 14, 2017.

(51) Int. Cl.
| | |
|---|---|
| B22F 3/00 | (2021.01) |
| B22F 3/22 | (2006.01) |
| B29C 64/165 | (2017.01) |
| B29C 64/386 | (2017.01) |
| B33Y 10/00 | (2015.01) |
| B33Y 50/02 | (2015.01) |
| B33Y 70/00 | (2020.01) |

(Continued)

(52) U.S. Cl.
CPC ........... *B22F 10/10* (2021.01); *B22F 3/22* (2013.01); *B29C 64/165* (2017.08); *B29C 64/386* (2017.08); *B33Y 10/00* (2014.12); *B33Y 50/02* (2014.12); *B33Y 70/00* (2014.12); *B22F 2999/00* (2013.01); *B28B 1/001* (2013.01)

(58) Field of Classification Search
CPC . B22F 3/008; B22F 2003/1058; B29C 64/386
See application file for complete search history.

(56) References Cited

U.S. PATENT DOCUMENTS

| | | |
|---|---|---|
| 2004/0129351 A1 | 7/2004 | Iwasaki |
| 2014/0039662 A1 | 2/2014 | Boyer et al. |

(Continued)

OTHER PUBLICATIONS

Cohen, "Additive Manufacturing of Functional Constructs Under Process Uncertainty, Chapter 3: Geometric Feedback Control of Discrete-Deposition SFF Systems" A Dissertation Presented to the Faculty of Graduate School of Cornell University, 48 pages, (May 2010).

(Continued)

*Primary Examiner* — Anthony J Zimmer
*Assistant Examiner* — Jeremy C Jones
(74) *Attorney, Agent, or Firm* — Oak Law, PLLC; Jonathan D. Hall

(57) ABSTRACT

A camera assembly is employed in additive manufacturing to improve the fidelity of a printed object. The camera may scan the surface of a build plate of a 3D printer and an object as it is being printed to generate image data. The image data is processed to detect errors in the build plate or printed object. The printer compensates for the detected errors, which can including modifying the printer configuration and/or modifying the instructions for printing a given object. Using the updated configuration, subsequent objects may then be printed, under a corrected process, to produce an object with fidelity to an original object model.

14 Claims, 19 Drawing Sheets

LATERAL VIEW

(51) Int. Cl.
    *B22F 10/10*     (2021.01)
    *B28B 1/00*     (2006.01)

(56) References Cited

U.S. PATENT DOCUMENTS

2015/0004046 A1   1/2015  Graham et al.
2016/0023403 A1*  1/2016  Ramos ................ B29C 64/106
                                                      425/171

OTHER PUBLICATIONS

Everton et al., "Review of in-situ process monitoring and in-situ metrology for metal additive manufacturing," Materials and Designs, vol. 95, pp. 431-445 (2016).
Heralic, et al., "Height control of laser metal-wire deposition based on interative learning control and 3D scanning," Optics and Lasers in Engineering, vol. 50, pp. 1230-1241, (2012).
Mani et al., "Measurement Science Needs for Real-time Control of Additive Manufacturing Powder Bed Fusion Processes," National Institute of Standards and Technology, U.S. Department of Commerce, NISTIR 8036, 50 pages, (Feb. 2015).
Purtonen et al., "Monitoring and adaptive control of laser processes," Physics Procedia, 8th International Conference on Photonic Technologies LANE 2014, vol. 56, pp. 1218-1231 (2014).
Wang, "Calibration of shrinkage and beam offset in SLS process," Rapid Prototyping Journal, vol. 5, No. 3, pp. 29-133, (1999).
International Search Report and Written Opinion dated Jun. 26, 2018 for International Application No. PCT/US2018/027504, entitled "Calibration of 3D Printer Via Computer Vision," 19 pages.

* cited by examiner

PLAN VIEW

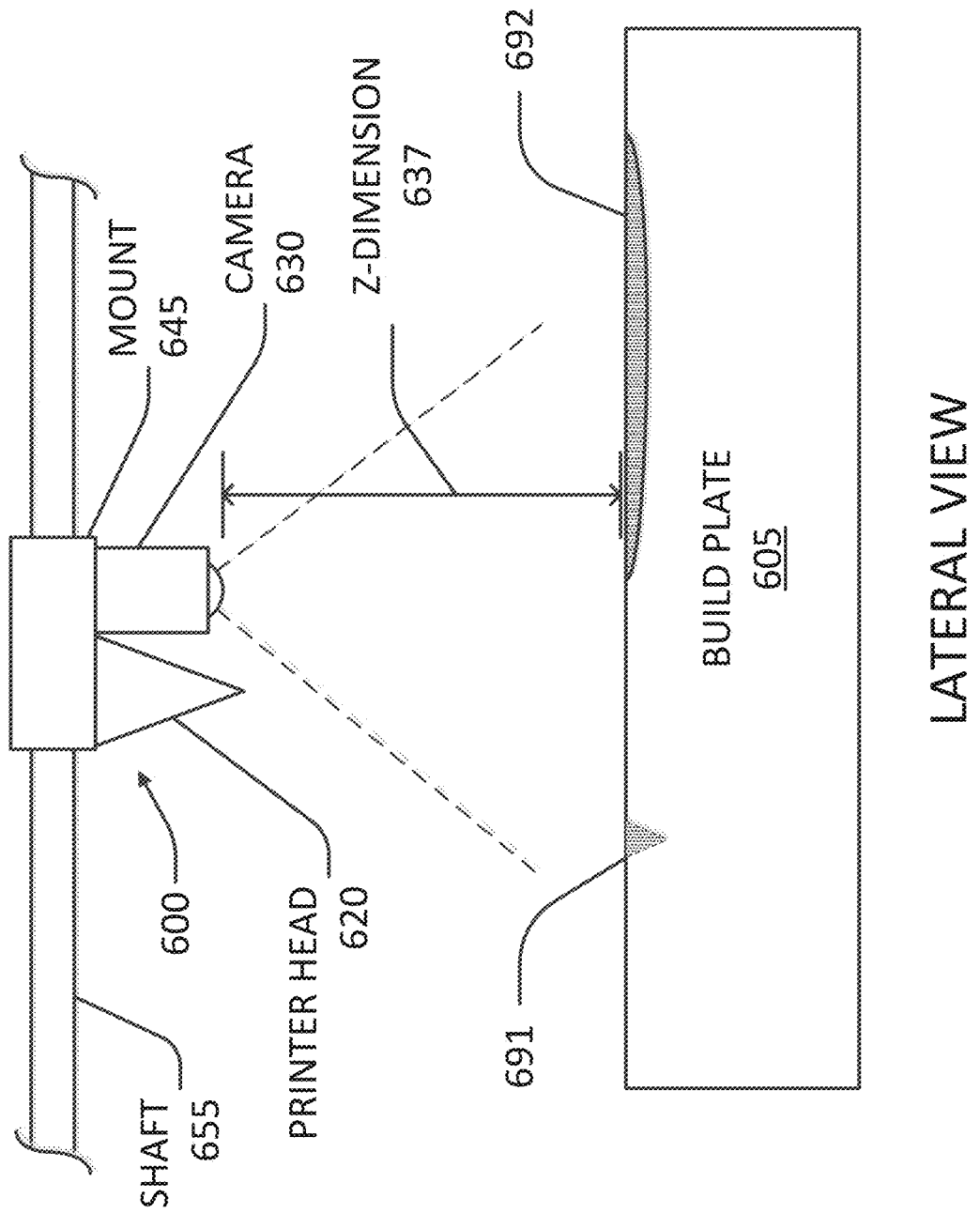

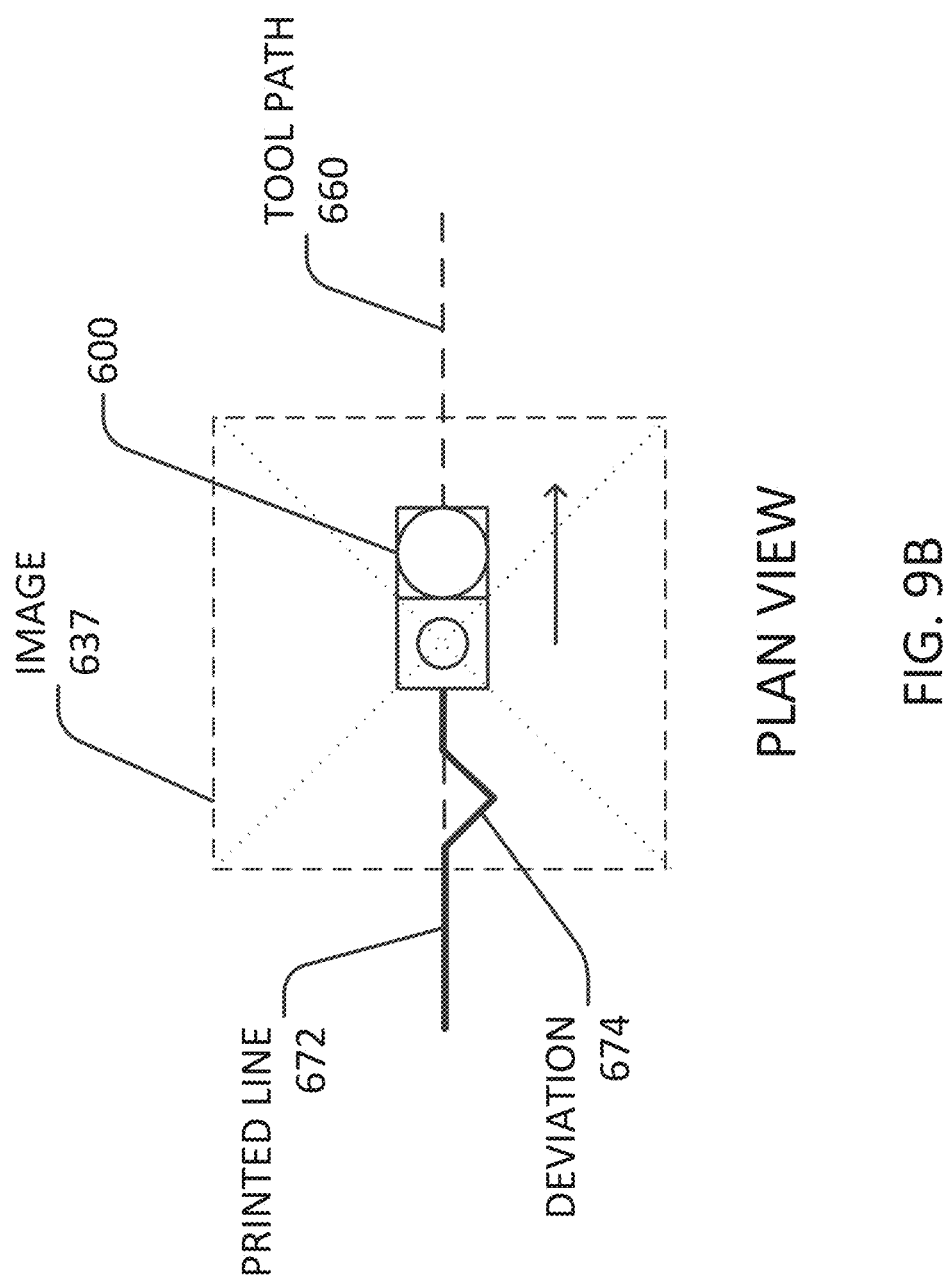

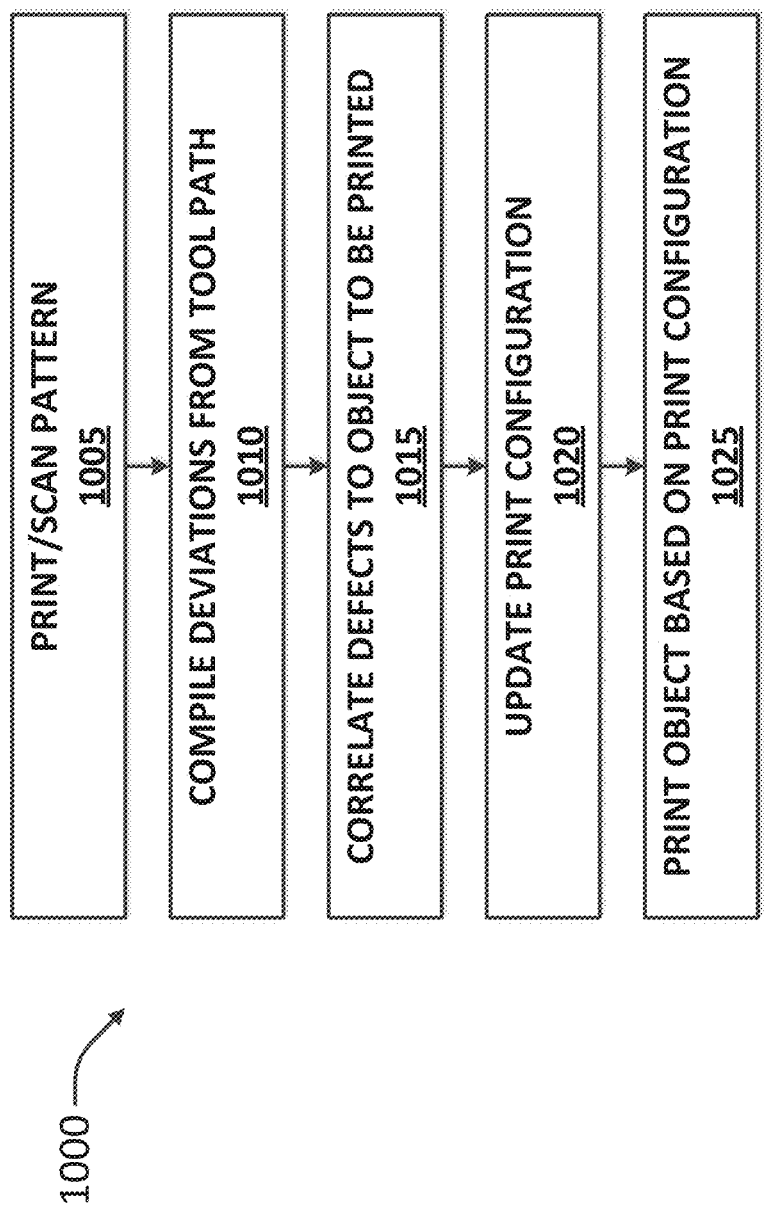

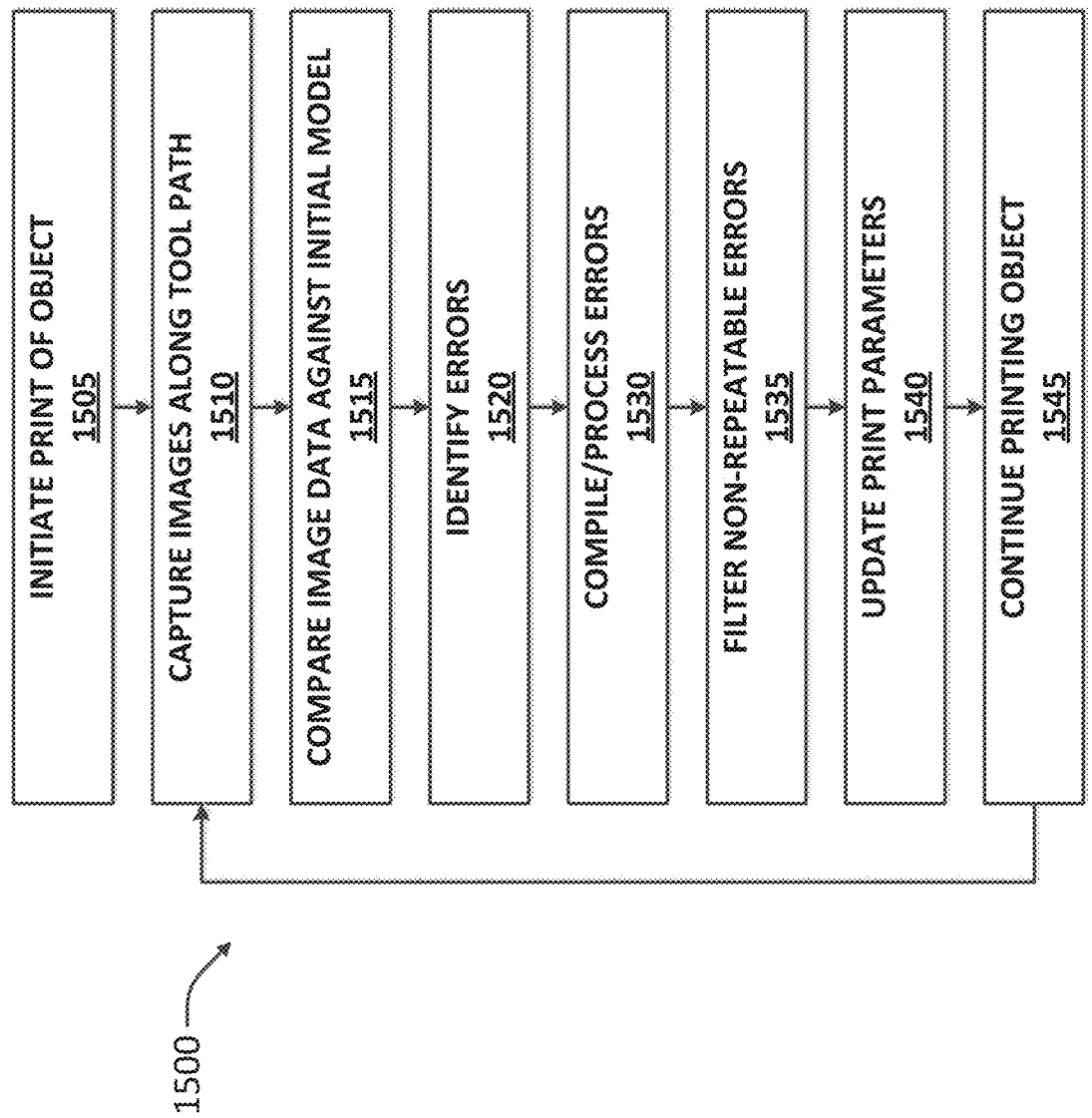

SYSTEMS AND METHODS FOR CALIBRATION FEEDBACK FOR ADDITIVE MANUFACTURING

CROSS REFERENCE TO RELATED APPLICATIONS

This application is a continuation of U.S. patent application Ser. No. 15/487,909, filed Apr. 14, 2017, the content of which is incorporated by reference herein in its entirety.

BACKGROUND

Metal injection molding (MIM) is a metalworking process useful in creating a variety of metal objects. A mixture of powdered metal and binder (e.g., a polymer such as polypropylene) forms a "feedstock" capable of being molded, at a high temperature, into the shape of a desired object. The initial molded part, also referred to as a "green part," then undergoes a debinding process to remove the binder, followed by a sintering process. During sintering, the part is brought to a temperature near the melting point of the powdered metal, which evaporates any remaining binder and forming the metal powder into a solid mass, thereby producing the desired object.

Additive manufacturing, also referred to as 3D printing, includes a variety of techniques for manufacturing a three-dimensional object via an automated process of forming successive layers of the object. 3D printers may utilize a feedstock comparable to that used in MIM, thereby creating a green part without the need for a mold. The green part may then undergo comparable debinding and sintering processes to produce the object.

SUMMARY

Example embodiments provide for fabricating objects through additive manufacturing. In one embodiment, a surface of a build plate of a 3D printer is scanned to generate an image of the build plate. A depth map of the build plate is then generated, the depth map indicating deviations from a defined plane at a surface of the build plate. A print configuration may then be updated based on the depth map, where the print configuration includes values enabling compensation for the deviations during printing of an object. Using the updated configuration, an object may then be printed, under a compensated process, to produce an object with fidelity to an original object model.

In further embodiments, scanning the surface of the build plate may include capturing at one or more photographs of the build plate via a camera coupled to a print head. The photographs may be stitched together to generate a single image of the build plate. The camera and print head may be moved through distinct locations above the build plate to capture the photographs. A tool path may be generated for a print head based on the print configuration, wherein printing the object includes controlling the print head to print the object based on the tool path. A calibration object (e.g., a pattern printed on the build plate) may be scanned in addition to the build plate, and the print configuration may be updated based on the calibration object. In particular, the geometry of a representation of the object may be generated based on deviations between the calibration object and the depiction of the calibration object. Further, a positional error vectormap may be produced based on the depiction of the at least one calibration object.

In still further embodiments, material deposition flow rate may be controlled, as a function of tool location and the print configuration, to compensate for the deviations. Updating the print configuration may include updating a configuration of a motion system of the 3D printer, and may incorporate an offset plane defining a location for printing an object layer, the offset plane enabling compensation for the deviations during printing of an object. The offset plane may further enable compensation for deviations between the defined plane and a motion plane occupied by a print head of the 3D printer. The update to the print configuration may include an update to the firmware of the 3D printer. Embodiments may further include generating print parameters based on an initial model of the object and the depth map, the print parameters defining geometry of the object with offsets to the initial model, the offsets corresponding to the deviations.

Further embodiments may include a method of printing an object following fabrication and printing of an initial object. A first object may be printed at a 3D printer based on an initial model of an object. A plurality of layers of the first object may be scanned concurrently with the printing to generate image data of the first object. Deviations may be detected between the image data and the initial model. A print configuration of the 3D printer may be updated based on the image data, where the print configuration defines operation of the 3D printer and including values enabling compensation for the deviations during printing of an object. A second object may then be printed under the updated print configuration.

Still further embodiments may include a method of printing and scanning successive objects. A first object may be printed at a 3D printer based on an initial model of an object. A plurality of layers of the first object may be scanned concurrently with the printing to generate image data of the first object. Deviations may be detected between the image data and the initial model. Print parameters of the object may be updated based on an initial model of the object and the image data, the print parameters defining geometry of the object with offsets to the initial model based on the detected deviations. A second object may then be printed based on the updated print parameters.

In yet further embodiments, photographs of a plurality of cross-sectional layers of the first object may be captured concurrently with the printing of the first object, the image data incorporating the photographs. Updating the print parameters may include modifying the geometry of a representation of the object based on deviations between the initial model and the photographs of the plurality of cross-sectional layers of the first object. Updating the print parameters may also include generating a correction tool path for a print head based on the detected deviations. The second object may be printed by controlling the print head based on the correction tool path. Further, during printing of the second object, material deposition flow rate may be controlled as a function of tool location and the correction tool path. The correction tool path may also be implemented to correct the printing of the first object, by printing an initial portion of the object, and then printing a successive portion of the first object according to the correction tool path. Further updating the print parameters may include generating a correction model of the object, the correction model defining geometry of the object with offsets to the initial model based on the detected deviations.

Yet further embodiments of the object may include a system for printing objects. The system may include a build chamber, a print head, a camera, and a controller. The print head may be configured to print objects within the build chamber, and the camera may be mounted to the print and configured to capture images within the build chamber. The controller may be configured to 1) control the camera to scan a plurality of layers of a first object concurrently with printing of the first object to generate image data of the first object, 2) detecting deviations between the image data and an initial model of the object, and 3) update print parameters of the object based on an initial model of the object and the image data, the print parameters defining geometry of the object with offsets to the initial model based on the detected deviations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 7A-B illustrate a camera and print head assembly during a scan of a build plate.

FIGS. 9A-B illustrate a printed calibration pattern in one embodiment.

FIG. 10 is a flow diagram of a process of calibrating a printer based on a printed calibration pattern.

FIG. 15 is a flow diagram of a process of modifying print parameters for an object undergoing a print based on a simultaneous scan of the object.

DETAILED DESCRIPTION OF THE INVENTION

Figure 1:
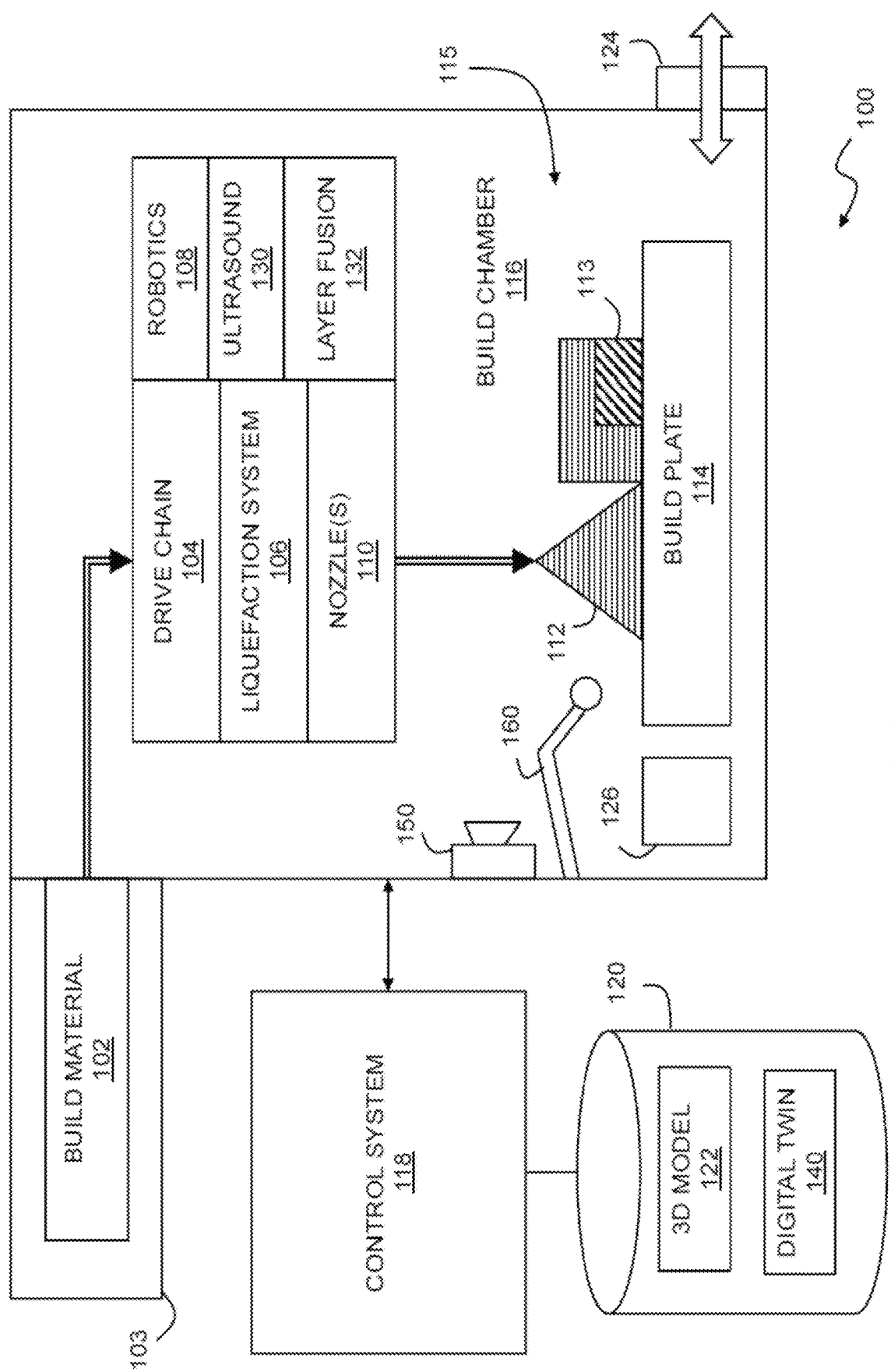
FIG. 1 is a block diagram of an additive manufacturing system for use with composites.

FIG. 1 is a block diagram of an additive manufacturing system for use with composites. The additive manufacturing system may include a three-dimensional printer 100 (or simply printer 100) that deposits metal using fused filament fabrication. Fused filament fabrication is well known in the art, and may be usefully employed for additive manufacturing with suitable adaptations to accommodate the forces, temperatures and other environmental requirements typical of the metallic injection molding materials described herein.

In general, the printer 100 may include a build material 102 that is propelled by a drive train 104 and heated to a workable state by a liquefaction system 106, and then dispensed through one or more nozzles 110. By concurrently controlling robotic system 108 to position the nozzle(s) along an extrusion path, an object 112 may be fabricated on a build plate 114 within a build chamber 116. In general, a control system 118 manages operation of the printer 100 to fabricate the object 112 according to a three-dimensional model using a fused filament fabrication process or the like.

A variety of commercially available compositions have been engineered for metal injection molding ("MIM"). These highly engineered materials can also be adapted for use as a build material 102 in printing techniques such as fused filament fabrication. For example, MIM feedstock materials, when suitably shaped, may be usefully extruded through nozzles typical of commercially available FFF machines, and are generally flowable or extrudable within typical operating temperatures (e.g., 160-250 degrees Celsius) of such machines. This temperature range may depend on the binder—e.g., some binders achieve appropriate viscosities at about 205 degrees Celsius, while others achieve appropriate viscosities at lower temperatures such as about 160-180 C degrees Celsius. One of ordinary skill will recognize that these ranges (and all ranges listed herein) are provided by way of example and not of limitation. Further, while there are no formal limits on the dimensions for powder metallurgy materials, parts with dimensions of around 100 millimeters on each side have been demonstrated to perform well for FFF fabrication of net shape green bodies. Any smaller dimensions may be usefully employed, and larger dimensions may also be employed provided they are consistent with processing dimensions such as the print resolution and the extrusion orifice diameter. For example, implementations target about a 0.300 µm diameter extrusion, and the MIM metal powder may typically be about 1-22 µm diameter, although nano sized powders can be used. The term metal injection molding material, as used herein, may include any such engineered materials, as well as other fine powder bases such as ceramics in a similar binder suitable for injection molding. Thus, where the term metal injection molding or the commonly used abbreviation, MIM, is used, the term may include injection molding materials using powders other than, or in addition to, metals and, thus, may include ceramics. Also, any reference to "MIM materials," "powder metallurgy materials," "MIM feedstocks," or the like may generally refer to metal powder and/or ceramic powder mixed with one or more binding materials, e.g., a backbone binder that holds everything together and a bulk binder that carries the metal and backbone into position within a mold or print. Other material systems may be suitable for fabricating metal parts using fabrication techniques such as stereolithography or binder jetting, some of which are discussed in greater detail below. Such fabrication techniques may, in some applications, be identical to techniques for fabricating parts from ceramic material.

In general, fabrication of such materials may proceed as with a conventional FFF process, except that after the net shape is created, the green part may be optionally machined or finished while in a more easily workable state, and then debound and sintered into a final, dense object using any of the methods common in the art for MIM materials. The final object, as described above, may include a metal, a metal alloy, a ceramic, or another suitable combination of materials.

The build material 102 may be fed from a carrier 103 configured to dispense the build material to the three-dimensional printer either in a continuous (e.g., wire) or discrete (e.g., billet) form. The build material 102 may for example be supplied in discrete units one by one as billets or the like into an intermediate chamber for delivery into the build chamber 118 and subsequent melt and deposition. In another aspect, the carrier 103 may include a spool or cartridge containing the build material 102 in a wire form. Where a vacuum or other controlled environment is desired, the wire may be fed through a vacuum gasket into the build chamber 118 in a continuous fashion, however, typical MIM materials can be heated to a workable plastic state under normal atmospheric conditions, except perhaps for filtering or the like to remove particles from the build chamber 116. Thus in one aspect, there is described herein an apparatus including a MIM build material formed into a wire, the build material including an engineered composite of metal powder and a polymeric binder or the like, wherein the carrier 103 is configured to dispense the build material in a continuous feed to a three-dimensional printer. For environmentally sensitive materials, the carrier 103 may provide a vacuum environment for the build material 102 that can be directly or indirectly coupled to the vacuum environment of the build chamber 118. More generally, the build chamber 118 (and the carrier 103) may maintain any suitably inert environment for handling of the build material 102, such as a vacuum, and oxygen-depleted environment, an inert gas environment, or some gas or combination of gasses that are not reactive with the build material 102 where such conditions are necessary or beneficial during three-dimensional fabrication.

A drive train 104 may include any suitable gears, compression pistons, or the like for continuous or indexed feeding of the build material 116 into the liquefaction system 106. In one aspect, the drive train 104 may include gear shaped to mesh with corresponding features in the build material such as ridges, notches, or other positive or negative detents. In another aspect, the drive train 104 may use heated gears or screw mechanisms to deform and engage with the build material. Thus there is described in one aspect a printer for a fused filament fabrication process that heats a build material to a working temperature, and that heats a gear that engages with, deforms, and drives the composite in a feed path. A screw feed may also or instead be used.

For more brittle MIM materials, a fine-toothed drive gear of a material such as a hard resin or plastic may be used to grip the material without excessive cutting or stress concentrations that might otherwise crack, strip, or otherwise compromise the build material.

In another aspect, the drive train 104 may use bellows, or any other collapsible or telescoping press to drive rods, billets, or similar units of build material into the liquefaction system 106. Similarly, a piezoelectric or linear stepper drive may be used to advance a unit of build media in a non-continuous, stepped method with discrete, high-powered mechanical increments. In another aspect, the drive train 104 may include multiple stages. In a first stage, the drive train 104 may heat the composite material and form threads or other features that can supply positive gripping traction into the material. In the next stage, a gear or the like matching these features can be used to advance the build material along the feed path. A collet feed may be used (e.g., similar to those on a mechanical pencil). A soft wheel or belt drive may also or instead be used. In an aspect, a shape forming wheel drive may be used to ensure accuracy of size and thus the build. More generally, the drive train 104 may include any mechanism or combination of mechanisms used to advance build material 102 for deposition in a three-dimensional fabrication process.

The liquefaction system 106 may be any liquefaction system configured to heat the composite to a working temperature in a range suitable for extrusion in a fused filament fabrication process. Any number of heating techniques may be used. In one aspect, electrical techniques such as inductive or resistive heating may be usefully applied to liquefy the build material 102. This may, for example include inductively or resistively heating a chamber around the build material 102 to a temperature at or near the glass transition temperature of the build material 102, or some other temperature where the binder or other matrix becomes workable, extrudable, or flowable for deposition as described herein. Where the contemplated build materials are sufficiently conductive, they may be directly heated through contact methods (e.g., resistive heating with applied current) or non-contact methods (e.g., induction heating using an external electromagnet to drive eddy currents within the material). The choice of additives may further be advantageously selected to provide bulk electrical characteristics (e.g., conductance/resistivity) to improve heating. When directly heating the build material 102, it may be useful to model the shape and size of the build material 102 in order to better control electrically-induced heating. This may include estimates or actual measurements of shape, size, mass, etc.

In the above context, "liquefaction" does not require complete liquefaction. That is, the media to be used in printing may be in a multi-phase state, and/or form a paste or the like having highly viscous and/or non-Newtonian fluid properties. Thus the liquefaction system 106 described herein may include, more generally, any system that places a build material 102 in condition for use in fabrication as described herein.

In order to facilitate resistive heating of the build material 102, one or more contact pads, probes or the like may be positioned within the feed path for the material in order to provide locations for forming a circuit through the material at the appropriate location(s). In order to facilitate induction heating, one or more electromagnets may be positioned at suitable locations adjacent to the feed path and operated, e.g., by the control system 118, to heat the build material internally through the creation of eddy currents. In one aspect, both of these techniques may be used concurrently to achieve a more tightly controlled or more evenly distributed electrical heating within the build material. The printer 100 may also be instrumented to monitor the resulting heating in a variety of ways. For example, the printer 100 may monitor power delivered to the inductive or resistive circuits. The printer 100 may also or instead measure temperature of the build material 102 or surrounding environment at any number of locations. In another aspect, the temperature of the build material 102 may be inferred by measuring, e.g., the amount of force required to drive the build material 102 through a nozzle 110 or other portion of the feed path, which may be used as a proxy for the viscosity of the build material 102. More generally, any techniques suitable for measuring temperature or viscosity of the build material 102 and responsively controlling applied electrical energy may be used to control liquefaction for a fabrication process using composites as described herein.

The liquefaction system 106 may also or instead include any other heating systems suitable for applying heat to the build material 102 to a suitable temperature for extrusion. This may, for example include techniques for locally or globally augmenting heating using, e.g., chemical heating, combustion, ultrasound heating, laser heating, electron beam heating or other optical or mechanical heating techniques and so forth.

The liquefaction system 106 may include a shearing engine. The shearing engine may create shear within the composite as it is heated in order to maintain a mixture of the metallic base and a binder or other matrix, or to maintain a mixture of various materials in a paste or other build material. A variety of techniques may be employed by the shearing engine. In one aspect, the bulk media may be axially rotated as it is fed along the feed path into the liquefaction system 106. In another aspect, one or more ultrasonic transducers may be used to introduce shear within the heated material. Similarly, a screw, post, arm, or other physical element may be placed within the heated media and rotated or otherwise actuated to mix the heated material. In an aspect, bulk build material may include individual pellets, rods, or coils (e.g., of consistent size) and fed into a screw, a plunger, a rod extruder, or the like. For example, a coiled build material can be uncoiled with a heater system including a heated box, heated tube, or heater from the print head. Also, a direct feed with no heat that feeds right into the print head is also possible.

The robotic system 108 may include a robotic system configured to three-dimensionally position the nozzle 110 within the working volume 115 of the build chamber 116. This may, for example, include any robotic components or systems suitable for positioning the nozzle 110 relative to the build plate 114 while depositing the composite in a pattern to fabricate the object 112. A variety of robotics systems are known in the art and suitable for use as the robotic system 108 described herein. For example, the robotics may include a Cartesian or xy-z robotics system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of the nozzle 110 relative to the build plate 114, especially within a vacuum or similar environment, may be usefully employed including any mechanism or combination of mechanisms suitable for actuation, manipulation, locomotion and the like within the build chamber 116.

The nozzle(s) 110 may include one or more nozzles for dispensing the build material 102 that has been propelled with the drive train 104 and heated with the liquefaction system 106 to a suitable working temperature. In a multi-phase extrusion this may include a working temperature above the melting temperature of the metallic base of the composite, or more specifically between a first temperature at which the metallic base melts and the second temperature (above the first temperature) at which a second phase of the composite remains inert.

The nozzles 110 may, for example, be used to dispense different types of material so that, for example, one nozzle 110 dispenses a composite build material while another nozzle 110 dispenses a support material in order to support bridges, overhangs, and other structural features of the object 112 that would otherwise violate design rules for fabrication with the composite build material. In another aspect, one of the nozzles 110 may deposit a different type of material, such as a thermally compatible polymer or a metal or polymer loaded with fibers of one or more materials to increase tensile strength or otherwise improve mechanical properties of the resulting object 112. In an aspect, two types of supports may be used—(1) build supports and (2) sinter supports—e.g., using different materials printed into the same part to achieve these supports, or to create a distinguishing junction between these supports and the part.

The nozzle 110 may preferably be formed of a material or combination of materials with suitable mechanical and thermal properties. For example, the nozzle 110 will preferably not degrade at the temperatures wherein the composite material is to be dispensed, or due to the passage of metallic particles through a dispensing orifice therein. While nozzles for traditional polymer-based fused filament fabrication may be made from brass or aluminum alloys, a nozzle that dispenses metal particles may be formed of harder materials, or materials compatible with more elevated working temperatures such as a high carbon steel that is hardened and tempered. Other materials such as a refractory metal (e.g. molybdenum, tungsten) or refractory ceramic (e.g. mullite, corundum, magnesia) may also or instead be employed. In some instances, aluminum nozzles may instead be used for MIM extrusion of certain MIM materials. In another aspect, a softer thermally conductive material with a hard, wear-resistant coating may be used, such as copper with a hard nickel plating.

In one aspect, the nozzle 110 may include one or more ultrasound transducers 130 as described herein. Ultrasound may be usefully applied for a variety of purposes in this context. In one aspect, the ultrasound energy may facilitate extrusion by mitigating clogging by reducing adhesion of a build material to an interior surface of the nozzle 110. A variety of energy director techniques may be used to improve this general approach. For example, a deposited layer may include one or more ridges, which may be imposed by an exit shape of the nozzle 110, to present a focused area to receive ultrasound energy introduced into the interface between the deposited layer and an adjacent layer.

In another aspect, the nozzle 110 may include an induction heating element, resistive heating element, or similar components to directly control the temperature of the nozzle 110. This may be used to augment a more general liquefaction process along the feed path through the printer 100, e.g., to maintain a temperature of the build material 102 during fabrication, or this may be used for more specific functions, such as declogging a print head by heating the build material 102 substantially above the working range, e.g., to a temperature where the composite is liquid. While it may be difficult or impossible to control deposition in this liquid state, the heating can provide a convenient technique to reset the nozzle 110 without more severe physical intervention such as removing vacuum to disassemble, clean, and replace the affected components.

In another aspect, the nozzle 110 may include an inlet gas or fan, e.g., an inert gas, to cool media at the moment it exits the nozzle 110. The resulting gas jet may, for example, immediately stiffen the dispensed material to facilitate extended bridging, larger overhangs, or other structures that might otherwise require support structures underneath.

The object 112 may be any object suitable for fabrication using the techniques described herein. This may include functional objects such as machine parts, aesthetic objects such as sculptures, or any other type of objects, as well as combinations of objects that can be fit within the physical constraints of the build chamber 116 and build plate 114.

Some structures such as large bridges and overhangs cannot be fabricated directly using fused filament fabrication or the like because there is no underlying physical surface onto which a material can be deposited. In these instances, a support structure 113 may be fabricated, preferably of a soluble or otherwise readily removable material, in order to support the corresponding feature.

Where multiple nozzles 110 are provided, a second nozzle may usefully provide any of a variety of additional build materials. This may, for example, include other composites, alloys, bulk metallic glass's, thermally matched polymers and so forth to support fabrication of suitable support structures. In one aspect, one of the nozzles 110 may dispense a bulk metallic glass that is deposited at one temperature to fabricate a support structure 113, and a second, higher temperature at an interface to a printed object 112 where the bulk metallic glass can be crystallized at the interface to become more brittle and facilitate mechanical removal of the support structure 113 from the object 112. Conveniently, the bulk form of the support structure 113 can be left in the super-cooled state so that it can retain its bulk structure and be removed in a single piece. Thus in one aspect there is described herein a printer that fabricates a portion of a support structure 113 with a bulk metallic glass in a super-cooled liquid region, and fabricates a layer of the support structure adjacent to a printed object at a greater temperature in order to crystalize the build material 102 into a non-amorphous alloy. The bulk metallic glass particles may thus be loaded into a MIM feedstock binder system and may provide a support. Pure binding or polymer materials (e.g., without any loading) may also or instead provide a support. A similar metal MIM feedstock may be used for multi-material part creation. Ceramic or dissimilar metal MIM feedstock may be used for a support interface material.

Support Materials

In general, the MIM media includes a binder and a metal powder (or other material as described herein, such as ceramic powder). A support material may also be provided from a second nozzle consisting of, e.g., the binder used for the injection molding material, without the structural material that sinters into the final object. In another aspect, the support material may be formed of a wax, or some other thermoplastic or other polymer that can be removed during processing of a printed green body. This support material may, for example, be used for vertical supports, as well as for top or side supports, or any other suitable support structures to provide a physical support during printing and subsequent sintering. Printing and sintering may impose different support requirements. As such, different support materials and or different support rules may be employed for each type of required support. Additionally, the print supports may be removed after a print and before sintering, while sintering supports would be left attached to the green object until sintering is completed (or sufficiently completed to eliminate the need for the sintering support structures).

In another aspect, the second nozzle (or a third nozzle) may be used to provide an interface material that is different from the support material, such as the corresponding binder, along with a ceramic or some other material that will not sinter under the time and temperature conditions used to sinter the injection molding material. This may also or instead include a metal or the like that forms a brittle interface with the sintered part so that it can break away from the final object easily after sintering. Where this interface material does not sinter, it may be used in combination with a sinterable support structure that can continue to provide structural support during a sintering process.

The support material(s) may usefully integrate other functional substances. For example, titanium may be added to the support material as an oxygen getter to improve the build environment without introducing any titanium into the fabricated object. Other types of additives may also or instead be used to remove contaminants. For example, a zirconium powder (or other strong carbide former) may be added to the support material in order to extract carbon contamination during sintering.

Nested Parts

In one aspect, the use of non-structural support at the interface, e.g. a pure binder that does not sinter into a structural object, may be used to facilitate the additive manufacture of nested parts. For example, a complete gear box or the like may be fabricated within an enclosure, with the surfaces between gear teeth fabricated with a non-sintering binder or other material. In one aspect, critical mechanical interfaces for such mechanical parts may be oriented to the fabrication process, e.g., by orienting mating surfaces vertically so that smaller resolutions can be used. More generally, the capability to print adjacent, non-coupled parts may be used to fabricate multiple physically related parts in a single print job. This may, for example, include hinges, gears, captive bearings or other nested or interrelated parts. Non-sintering support material may be extracted, e.g., using an ultrasonicator, fluid cleaning, or other techniques after the object is sintered to a final form. In an aspect, the binder is loaded with a non-sintering additive such as ceramic or dissimilar, higher sintering temp metal.

This general approach may also affect the design of the part. For example, axles may employ various anti-backlash techniques so that the sintered part is more securely retained during movement and use. Similarly, fluid paths may be provided for fluid cleaning, and removal paths may be created for interior support structures. This technique may also be used to address other printing challenges. For example, support structures within partially enclosed spaces may be fabricated for removal through some removal path after the object is completed. If the support structures are weakly connected, or unconnected, to the fabricated object, they can be physically manipulated for extraction through the removal path. In an aspect, parts may be "glued" together with an appropriate (e.g., the same) MIM material to make larger parts that essentially have no joints once sintered.

The build plate 114 within the working volume 115 of the build chamber 116 may include a rigid and substantially planar surface formed of any substance suitable for receiving deposited composite or other material(s)s from the nozzles 110. In one aspect, the build plate 114 may be heated, e.g., resistively or inductively, to control a temperature of the build chamber 116 or the surface upon which the object 112 is being fabricated. This may, for example, improve adhesion, prevent thermally induced deformation or failure, and facilitate relaxation of stresses within the fabricated object. In another aspect, the build plate 114 may be a deformable build plate that can bend or otherwise physical deform in order to detach from the rigid object 112 formed thereon.

The build chamber 116 may be any chamber suitable for containing the build plate 114, an object 112, and any other components of the printer 100 used within the build chamber 116 to fabricate the object 112. In one aspect, the build chamber 116 may be an environmentally sealed chamber that can be evacuated with a vacuum pump 124 or similar device in order to provide a vacuum environment for fabrication. This may be particularly useful where oxygen causes a passivation layer that might weaken layer-to-layer bonds in a fused filament fabrication process as described herein, or where particles in the atmosphere might otherwise interfere with the integrity of a fabricated object, or where the build chamber 116 is the same as the sintering chamber. In another aspect, only oxygen is removed from the build chamber 116.

Similarly, one or more passive or active oxygen getters 126 or other similar oxygen absorbing material or system may usefully be employed within the build chamber 116 to take up free oxygen within the build chamber 116. The oxygen getter 126 may, for example, include a deposit of a reactive material coating an inside surface of the build chamber 116 or a separate object placed therein that completes and maintains the vacuum by combining with or adsorbing residual gas molecules. The oxygen getters 126, or more generally, gas getters, may be deposited as a support material using one of the nozzles 110, which facilitates replacement of the gas getter with each new fabrication run and can advantageously position the gas getter(s) near printed media in order to more locally remove passivating gasses where new material is being deposited onto the fabricated object. In one aspect, the oxygen getters 126 may include any of a variety of materials that preferentially react with oxygen including, e.g., materials based on titanium, aluminum, and so forth. In another aspect, the oxygen getters 126 may include a chemical energy source such as a combustible gas, gas torch, catalytic heater, Bunsen burner, or other chemical and/or combustion source that reacts to extract oxygen from the environment. There are a variety of low-CO and NOx catalytic burners that may be suitably employed for this purpose without CO.

In one aspect, the oxygen getter 126 may be deposited as a separate material during a build process. Thus in one aspect there is described herein a process for fabricating a three-dimensional object from a metallic composite including co-fabricating a physically adjacent structure (which may or may not directly contact the three-dimensional object) containing an agent to remove passivating gasses around the three-dimensional object. Other techniques may be similarly employed to control reactivity of the environment within the build chamber 116, or within post-processing chambers or the like as described below. For example, the build chamber 116 may be filled with an inert gas or the like to prevent oxidation.

The control system 118 may include a processor and memory, as well as any other co-processors, signal processors, inputs and outputs, digital-to-analog or analog-to-digital converters and other processing circuitry useful for monitoring and controlling a fabrication process executing on the printer 100. The control system 118 may be coupled in a communicating relationship with a supply of the build material 102, the drive train 104, the liquefaction system 106, the nozzles 110, the build plate 114, the robotic system 108, and any other instrumentation or control components associated with the build process such as temperature sensors, pressure sensors, oxygen sensors, vacuum pumps, and so forth. The control system 118 may be operable to control the robotic system 108, the liquefaction system 106 and other components to fabricate an object 112 from the build material 102 in three dimensions within the working volume 115 of the build chamber 116.

The control system 118 may generate machine ready code for execution by the printer 100 to fabricate the object 112 from the three-dimensional model 122. The control system 118 may deploy a number of strategies to improve the resulting physical object structurally or aesthetically. For example, the control system 118 may use plowing, ironing, planing, or similar techniques where the nozzle 110 runs over existing layers of deposited material, e.g., to level the material, remove passivation layers, apply an energy director topography of peaks or ridges to improve layer-to-layer bonding, or otherwise prepare the current layer for a next layer of material. The nozzle 110 may include a low-friction or non-stick surface such as Teflon, TiN or the like to facilitate this plowing process, and the nozzle 110 may be heated and/or vibrated (e.g., using an ultrasound transducer) to improve the smoothing effect. In one aspect, this surface preparation may be incorporated into the initially-generated machine ready code. In another aspect, the printer 100 may dynamically monitor deposited layers and determine, on a layer-by layer basis, whether additional surface preparation is necessary or helpful for successful completion of the object.

In one aspect, the control system 118 may employ pressure or flow rate as a process feedback signal. While temperature is frequently the critical physical quantity for fabrication with thermoplastic binders, it may be difficult to accurately measure the temperature of a composite build material throughout the feed path. However, the temperature can be inferred by the viscosity of the build material, which can be estimated for the bulk material based on how much force is being applied to drive the material through a feed path. Thus in one aspect, there is described herein a printer that measures the force applied by a drive train to a composite such as any of the composites described above, infers a temperature of the build material based on the instantaneous force, and controls a liquefaction system to adjust the temperature accordingly.

In general, a three-dimensional model 122 of the object may be stored in a database 120 such as a local memory of a computer used as the control system 118, or a remote database accessible through a server or other remote resource, or in any other computer-readable medium accessible to the control system 118. The control system 118 may retrieve a particular three-dimensional model 122 in response to user input, and generate machine-ready instructions for execution by the printer 100 to fabricate the corresponding object 112. This may include the creation of intermediate models, such as where a CAD model is converted into an STL model or other polygonal mesh or other intermediate representation, which can in turn be processed to generate machine instructions for fabrication of the object 112 by the printer 100.

In another aspect, the nozzle 110 may include one or more mechanisms to flatten a layer of deposited material and apply pressure to bond the layer to an underlying layer. For example, a heated nip roller, caster, or the like may follow the nozzle 110 in its path through an x-y plane of the build chamber to flatten the deposited (and still pliable) layer. The nozzle 110 may also or instead integrate a forming wall, planar surface or the like to additionally shape or constrain a build material 102 as it is deposited by the nozzle 110. The nozzle 110 may usefully be coated with a non-stick material (which may vary according to the build material being used) in order to facilitate more consistent shaping and smoothing by this tool.

In another aspect, a layer fusion system 132 may be used to encourage good mechanical bonding between adjacent layers of deposited build material within the object 112. This may include the ultrasound transducers described above, which may be used to facilitate bonding between layers by applying ultrasound energy to an interface between layers during deposition. In another aspect, current may be passed through an interface between adjacent layers in order to Joule heat the interface and liquefy or soften the materials for improved bonding. Thus in one aspect, the layer fusion system 132 may include a joule heating system configured to apply a current between a first layer of the build material and a second layer of the build material in the working volume 115 while the first layer is being deposited on the second layer. In another aspect, the layer fusion system 132 may include an ultrasound system for applying ultrasound energy to a first layer of the build material while the first layer is being deposited onto a second layer of the build material in the working volume 115. In another aspect, the layer fusion system 132 may include a rake, ridge(s), notch(es) or the like formed into the end of the nozzle 110, or a fixture or the like adjacent to the nozzle, in order to form energy directors on a top surface of a deposited material. Other techniques may also or instead be used to improve layer-to-layer bonding, such as plasma cleaning or other depassivation before or during formation of the interlayer bond. The use of injection molding materials can alleviate many of the difficulties of forming layer-to-layer bonds with deposited metals, but these and other techniques may nonetheless be useful in improving interlayer bonds and/or shaping a fabricated object as described herein.

During fabrication, detailed data may be gathered for subsequent use and analysis. This may, for example, include a camera and computer vision system that identifies errors, variations, or the like that occur in each layer of an object. Similarly, tomography or other imaging techniques may be used to detect and measure layer-to-layer interfaces, aggregate part dimensions, diagnostic information (e.g., defects, voids) and so forth. This data may be gathered and delivered with the object to an end user as a digital twin 140 of the object 112 so that the end user can evaluate whether and how variations and defects might affect use of the object 112. In addition to spatial/geometric analysis, the digital twin 140 may log process parameters including, for example, aggregate statistics such as weight of material used, time of print, variance of build chamber temperature, and so forth, as well as chronological logs of any process parameters of interest such as volumetric deposition rate, material temperature, environment temperature, and so forth.

The printer 100 may include a camera 150 or other optical device. In one aspect, the camera 150 may be used to create the digital twin 140 described above, or to more generally facilitate machine vision functions or facilitate remote monitoring of a fabrication process. Video or still images from the camera 150 may also or instead be used to dynamically correct a print process, or to visualize where and how automated or manual adjustments should be made, e.g., where an actual printer output is deviating from an expected output.

The printer 100 may also usefully integrate a subtractive fabrication tool 160 such as a drill, milling bit, or other multi-axis controllable tool for removing material from the object 112 that deviates from an expected physical output based on the 3D model 122 used to fabricate the object 112. While combinations of additive and subtractive technologies have been described, the use of MIM materials provides a unique advantage when subtractive shaping is performed on a green object after net shape forming but before sintering (or debinding), when the object 112 is relatively soft and workable. This permits quick and easy removal of physically observable defects and printing artifacts before the object 112 is sintered into a metal object. An aspect may instead include tapping threads or otherwise adding features as opposed to subtracting parts. Similarly, an aspect may include combining multiple single green parts into one larger fully solid sintered part.

Other useful features may be integrated into the printer 100 described above. For example, a solvent or other material may be usefully applied a surface of the object 112 during fabrication to modify its properties. This may, for example intentionally oxidize or otherwise modify the surface at a particular location or over a particular area in order to provide a desired electrical, thermal optical, or mechanical property. This capability may be used to provide aesthetic features such as text or graphics, or to provide functional features such as a window for admitting RF signals.

Design Rules

In general, a fabrication process such as fused filament fabrication implies, or expressly includes, a set of design rules to accommodate physical limitations of a fabrication device and a build material. For example, a horizontal shelf cannot be fabricated without positioning a support structure underneath. While the design rules for FFF may apply to fabrication of a green body using FFF techniques as described herein, the green body may also be subject to various MIM design rules. This may, for example, include a structure to prevent or minimize drag on a floor while a part shrinks during sintering which may be 20% or more depending on the composition of the green body. Similarly, certain supports are required during sintering that are different than the supports required during fused filament fabrication. As another example, injection molding typically aims for uniform wall thickness to reduce variability in debinding and/or sintering behaviors, with thinner walls being preferred. The system described herein may apply to disparate sets of design rules—those for the rapid prototyping system (e.g., fused filament fabrication) and those for the sintering process (e.g., MIM design rules)—to a CAD model that is being prepared for fabrication.

These rules may also be combined under certain conditions. For example, the support structures for a horizontal shelf during fabrication must resist the force of an extrusion/deposition process used to fabricate the horizontal shelf, whereas the support structure during sintering only needs to resist the forces of gravity during the baking process. Thus there may be two separate supports that are removed at different times during a fabrication process: the fabrication supports that are configured to resist the force of a fabrication process and may be breakaway supports that are loosely mechanically coupled to a green body, along with sintering supports that may be less extensive, and only need to resist the gravitation forces on a body during sintering. These latter supports are preferably coupled to the object through a nonsinterable layer to permit easy removal from the densified final object. In another aspect, the fabrication supports may be fabricated from binder without a powder or other fill so that they completely disappear during a sintering process.

Figure 2:
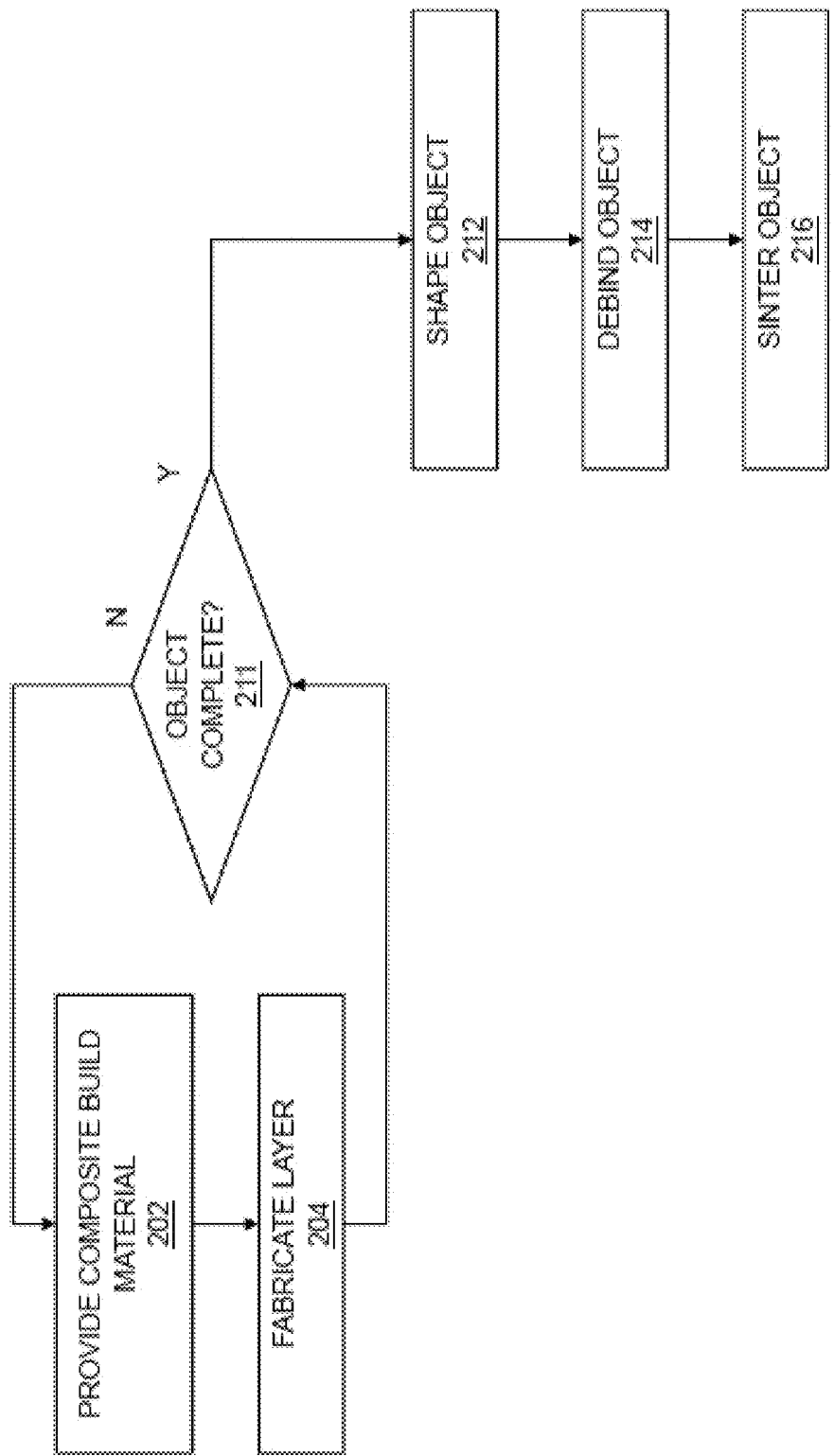
FIG. 2 is a flow chart of a method for printing with composites.

FIG. 2 shows a flow chart of a method for printing with composites, e.g., metal injection molding materials. As shown in step 202, the process 200 may include providing a build material including an injection molding material, or where a support interface is being fabricated, a MIM binder (e.g., a MIM binder with similar thermal characteristics). The material may include, for example, any of the MIM materials described herein. The material may be provided as a build material in a billet, a wire, or any other cast, drawn, extruded or otherwise shaped bulk form. As described above, the build material may be further packaged in a cartridge, spool, or other suitable carrier that can be attached to an additive manufacturing system for use.

As shown in step 204, the process may include fabricating a layer of an object. This may include any techniques that can be adapted for use with MIM materials. For example, this may include fused filament fabrication, jet printing, selective laser sintering, or any other techniques for forming a net shape from a MIM material (and more specifically for techniques used for forming a net shape from a polymeric material loaded with a second phase powder).

As shown in step 211, this process may be continued and repeated as necessary to fabricate an object within the working volume. While the process may vary according to the underlying fabrication technology, an object can generally be fabricated layer by layer based on a three-dimensional model of the desired object. As shown in step 212, the process 200 may include shaping the net shape object after the additive process is complete. Before debinding or sintering, the green body form of the object is usefully in a soft, workable state where defects and printing artifacts can be easily removed, either manually or automatically. Thus the process 200 may take advantage of this workable, intermediate state to facilitate quality control or other process-related steps, such as removal of supports that are required for previous printing steps, but not for debinding or sintering.

As shown in step 214, the process 200 may include debinding the printed object. In general debinding may be performed chemically or thermally to remove a binder that retains a metal (or ceramic or other) powder in a net shape. Contemporary injection molding materials are often engineered for thermal debinding, which advantageously permits debinding and sintering to be performed in a single baking operation, or in two similar baking operations. In general, the debinding process functions to remove binder from the net shape green object, thus leaving a very dense structure of metal (or ceramic or other) particles that can be sintered into the final form.

As shown in step 216, the process 200 may include sintering the printed and debound object into a final form. In general, sintering may be any process of compacting and forming a solid mass of material by heating without liquefaction. During a sintering process, atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, and the desired structural, functional or aesthetic result for the fabricated object. For example, in solid-state (non-activated) sintering, metal powder particles are heated to form connections (or "necks") where they are in contact. Over time, these necks thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity. Other advanced techniques such as nano-phase separation sintering may be used, for example to form a high-diffusivity solid at the necks to improve the transport of metal atoms at the contact point Debinding and sintering may result in material loss and compaction, and the resulting object may be significantly smaller than the printed object. However, these effects are generally linear in the aggregate, and net shape objects can be usefully scaled up when printing to create a corresponding shape after debinding and sintering.

Figure 3:
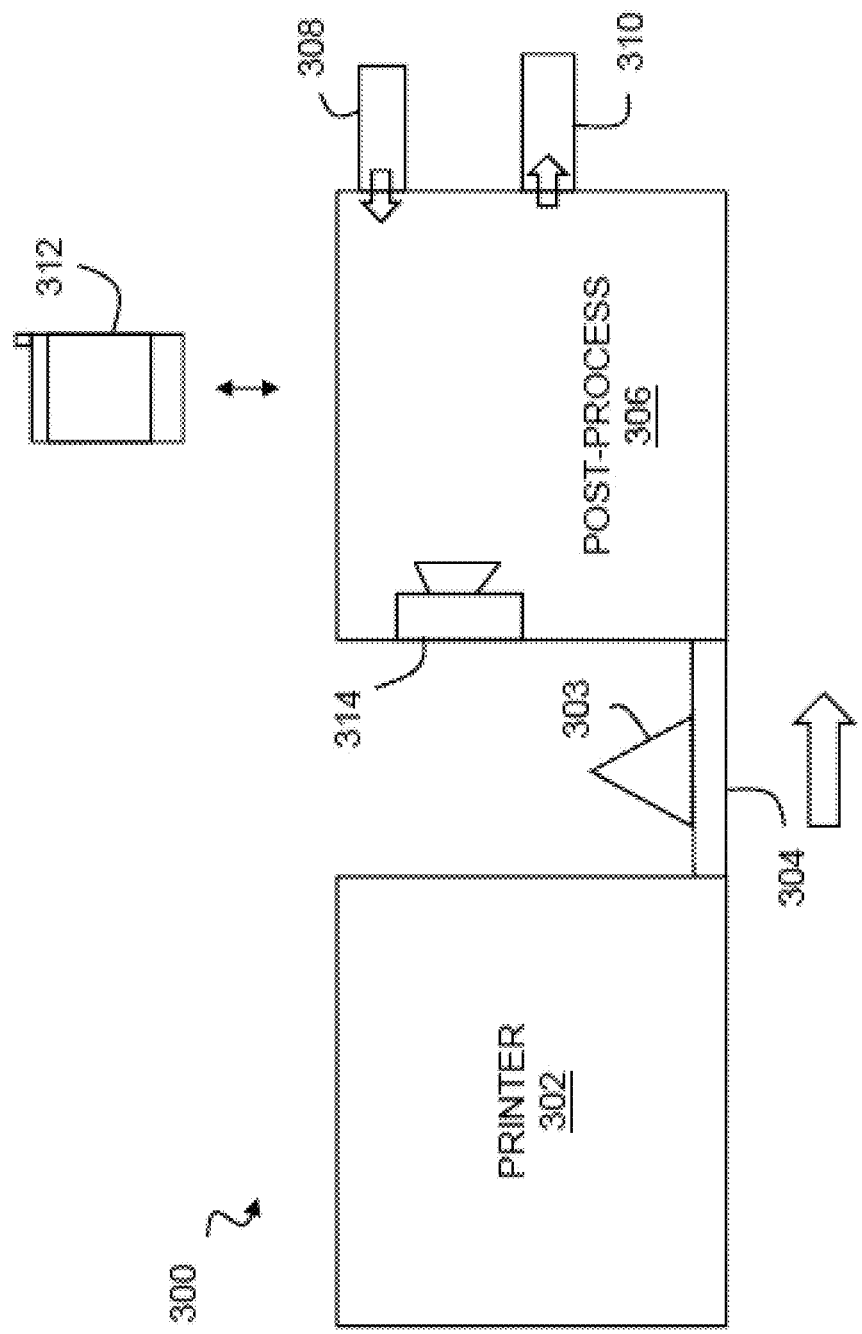
FIG. 3 illustrates an additive manufacturing system for use with metal injection molding materials.

FIG. 3 shows an additive manufacturing system for use with metal injection molding materials. The system 300 may include a printer 302, a conveyor 304, and a postprocessing station 306. In general, the printer 302 may be any of the printers described above including, for example a fused filament fabrication system, a stereolithography system, a selective laser sintering system, or any other system that can be usefully adapted to form a net shape object under computer control using injection molding build materials. The output of the printer 302 may be an object 303 that is a green body including any suitable powder (e.g., metal, metal alloy, ceramic, and so forth, as well as combinations of the foregoing), along with a binder that retains the powder in a net shape produced by the printer 302.

The conveyor 304 may be used to transport the object 303 from the printer 302 to a post-processing station 306 where debinding and sintering can be performed. The conveyor 304 may be any suitable device or combination of devices suitable for physically transporting the object 303. This may, for example, include robotics and a machine vision system or the like on the printer side for detaching the object 303 from a build platform or the like, as well as robotics and a machine vision system or the like on the post-processing side to accurately place the object 303 within the post-processing station 306. In another aspect, the post-processing station 306 may serve multiple printers so that a number of objects can be debound and sintered concurrently, and the conveyor 304 may interconnect the printers and post-processing station so that multiple print jobs can be coordinated and automatically completed in parallel. In another aspect, the object 303 may be manually transported between the two corresponding stations.

The post-processing station 306 may be any system or combination of systems useful for converting a green part formed into a desired net shape from a metal injection molding build material by the printer 302 into a final object. The post-processing station 306 may, for example, include a chemical debinding station and a thermal sintering station that can be used in sequence to produce a final object. Some contemporary injection molding materials are engineered for thermal debinding, which makes it possible to perform a combination of debinding and sintering steps with a single oven or similar device. While the thermal specifications of a sintering furnace may depend upon the powder to be sintered, the binder system, the loading, and other aspects of the green object and the materials used to manufacture same, commercial sintering furnaces for thermally debound and sintered MIM parts may typically operate with an accuracy of +/−5 degrees Celsius or better, and temperatures of at least 600 degrees C., or from about 200 degrees C. to about 1900 degrees C. for extended times. Any such furnace or similar heating device may be usefully employed as the post-processing station 306 as described herein. Vacuum or pressure treatment may also or instead be used. In an aspect, identical or similar material beads with a non-binding coating may be used for a furnace support—e.g., packing in a bed of this material that shrinks similar to the part, except that it will not bond to the part.

Embodiments may be implemented with a wide range of other debinding and sintering processes. For example, the binder may be removed in a chemical debind, thermal debind, or some combination of these. Other debinding processes are also known in the art (such as supercritical or catalytic debinding), any of which may also or instead be employed by the post-processing station 306 as described herein. For example, in a common process, a green part is first debound using a chemical debind, which is following by a thermal debind at a moderately high temperature (in this context, around 700-800 C) to remove organic binder and create enough necks among a powdered material to permit handling. From this stage, the object may be moved to a sintering furnace to remove any remaining components of a binder system densify the object. In another aspect, a pure thermal debind may be used to remove the organic binder. More general, any technique or combination of techniques may be usefully employed to debind an object as described herein.

Similarly, a wide range of sintering techniques may be usefully employed by the post-processing station. In one aspect, an object may be consolidated in a furnace to a high theoretical density using vacuum sintering. In another aspect, the furnace may use a combination of flowing gas (e.g., at below atmosphere, slightly above atmosphere, or some other suitable pressure) and vacuum sintering. More generally, any sintering or other process suitable for improving object density may be used, preferably where the process yields a near-theoretical density part with little or no porosity. Hot-isostatic pressing ("HIP") may also (e.g., as a postsinter finishing step) or instead be employed, e.g., by applying elevated temperatures and pressures of 10-50 ksi, or between about 15 and 30 ksi. In another aspect, the object may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. In another aspect, the object may be separately heated in one furnace, and then immersed in a hot granular media inside a die, with pressure applied to the media so that it can be transmitted to the object to drive more rapid consolidation to near full density. More generally, any technique or combination of techniques suitable for removing binder systems and driving a powdered material toward consolidation and densification may be used by the post-processing station 306 to process a fabricated green part as described herein.

In one aspect, the post-processing station 306 may be incorporated into the printer 302, thus removing a need for a conveyor 304 to physically transport the object 303. The build volume of the printer 302 and components therein may be fabricated to withstand the elevated debinding/sintering temperatures. In another aspect, the printer 302 may provide movable walls, barriers, or other enclosure(s) within the build volume so that the debind/sinter can be performed while the object 303 is on a build platform within the printer 302, but thermally isolated from any thermally sensitive components or materials.

The post-processing station 306 may be optimized in a variety of ways for use in an office environment. In one aspect, the post-processing station 306 may include an inert gas source 308. The inert gas source 308 may, for example, include argon or other inert gas (or other gas that is inert to the sintered material), and may be housed in a removable and replaceable cartridge that can be coupled to the post-processing station 306 for discharge into the interior of the post-processing station 306, and then removed and replaced when the contents are exhausted. The post-processing station 306 may also or instead include a filter 310 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In one aspect, the post-processing station 306 may be coupled to other system components. For example, the post-processing station 306 may include information from the printer 302, or from a controller for the printer, about the geometry, size, mass and other physical characteristics of the object 303 in order to generate a suitable debinding and sintering profile. In another aspect, the profile may be independently created by the controller or other resource and transmitted to the post-processing station 306 when the object 303 is conveyed. In another aspect, the post-processing station 306 may monitor the debinding and sintering process and provide feedback, e.g., to a smart phone or other remote device 312, about a status of the object, a time to completion, and other processing metrics and information. The post-processing station 306 may include a camera 314 or other monitoring device to provide feedback to the remote device 312, and may provide time lapse animation or the like to graphically show sintering on a compressed time scale. Post-processing may also or instead include finishing with heat, a hot knife, tools, or similar, and may include applying a finish coat.

Microwave Sintering

In one aspect, the post-processing station 306 may employ microwave sintering to accelerate post processing. Powdered metals in particular are very good absorbers of microwave energy and can be efficiently heated using microwave techniques. Ceramics can also be sintered in this manner, where microwave heating is linked to the dielectric loss of the material and other factors. Any other configuration suitable for microwave heating in an amount and for a duration suitable for sintering of MIM materials may also or instead be employed. Where the binder system of the build material is also engineered for thermal debinding, the method may include debinding the green object by applying microwave energy, e.g., using the post-processing station 306 described above.

Stereolithography with MIM Materials

Figure 4:
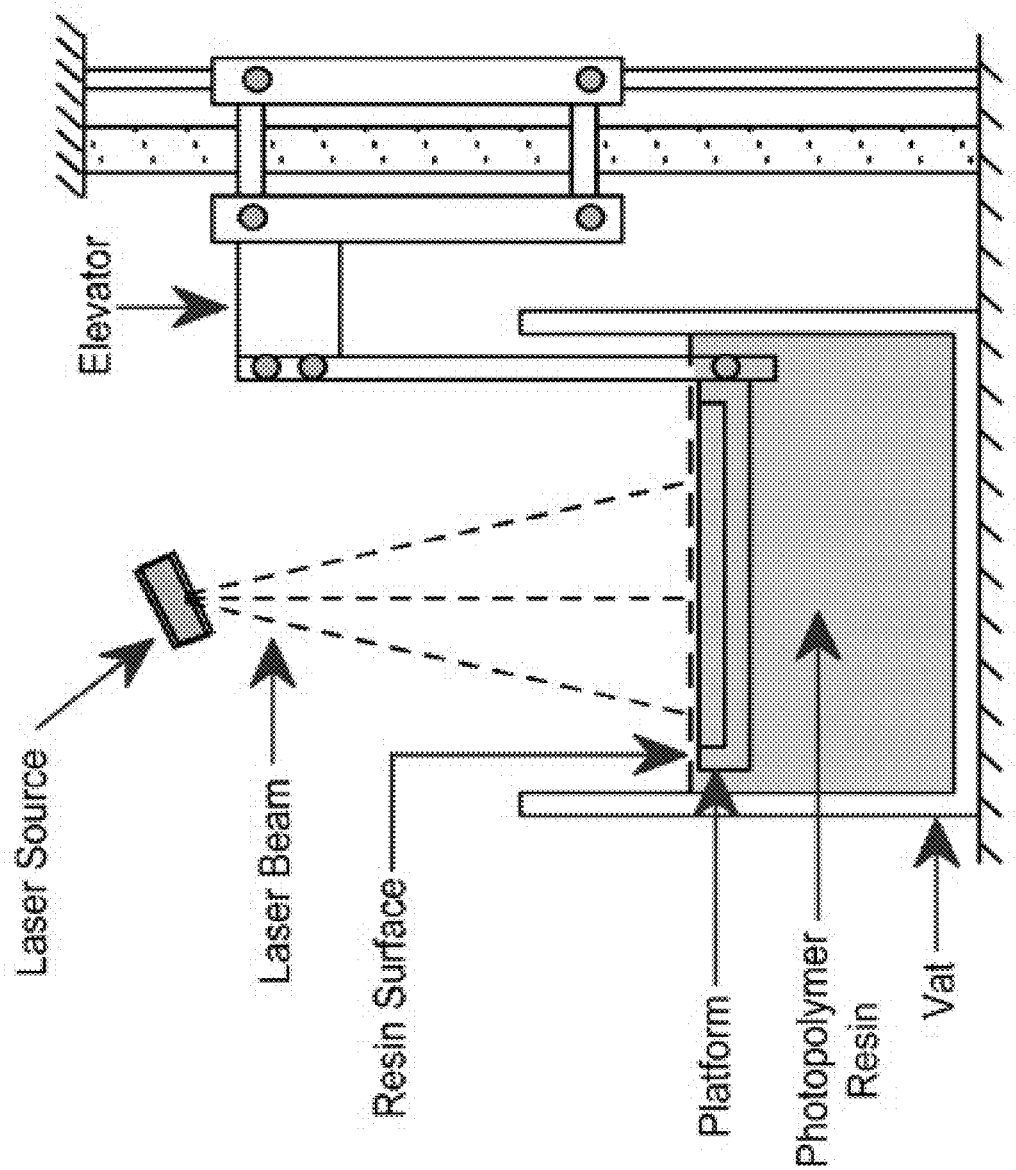
FIG. 4 illustrates a stereolithography process using a metallic powder and an ultraviolet-curable binder.

FIG. 4 illustrates a stereolithography process using a metallic powder and an ultraviolet-curable binder. In general, a build material may be formed using an injection molding powder, such as any of those described herein, along with an ultraviolet-curable binder such as any suitable photopolymer resin that can be cured using stereolithography. This build material may be cured on a layer-by-layer basis with an ultraviolet laser using known stereolithography techniques to form a UV-cured green body having a shape of the desired object. MIM powders may generally be opaque, and adaptations to the laser light source may be used to improve the structural integrity of the fabricated green object, such as using a layer size equal to or less than an average powder diameter, or providing laser light from multiple sources/directions in order to reduce or minimize occlusion of the UV resin at each layer. In another aspect, there is described herein a sinterable, net shape green body object based formed according to a computer model and including a base material in powder form and an ultraviolet curable (or ultraviolet-cured) resin that can be debound and/or sintered into a final object, as well as a process for sintering an object comprising a base material in powder form and an ultraviolet-cured resin. The metallic powder may be suspended within an ultraviolet-curable binder, creating a slurry or suspension. The mass and surface area of the particles versus the specific rheology of the binder may dictate whether or not the powder will float indefinitely or settle due to gravity. Using nano sized particles may optimize the powders ability to form a stable suspension that does not settle (over reasonable timescales).

In order to reduce binder char and subsequent carbon contamination and increase shape retention, the binder may usefully be composed of two parts—a UV curable resin and a second component that may be removed (e.g. debound) prior to insertion into the furnace. Similar multicomponent binder formulations have been shown to reduce carbon pickup from the burnout process and reduce part failures by buildup of gases inside the part. Many possible binder combinations exist, including poly(ethylene glycol) (PEG) as a solvent-soluble component that may be removed prior to insertion into the furnace, along with a backbone based on poly(ethylene glycol) diacrylate (PEG-DA), or any number of other UV curable resins.

The ultraviolet-curable resin may, for example include a commercially available investment casting resin engineered for stereolithography fabrication, or any other suitable UV curable resin or the like. The UV curable resin may usefully incorporate an increased concentration of an activating die (at least 50% greater than typical commercially available UV curable resins) to compensate for optical interference of opaque particles.

In another aspect, the process may be modified to address particle opacity in other ways. For example, the current layer may be coated with polymer (e.g., by moving the object along the z-axis within a bath, either up or down according to the species of stereolithography being employed), and then a powder may be introduced, after which the layer may be cured in a desired cross section using UV exposure. In another aspect, the layer may be cured, powdered, and then coated with another layer of powder, so that the resin is fully exposed to the UV stimulus before coating with an additional powder layer.

In another aspect, the mixture of a MIM powder and a UV-curable resin may be dispensed and cured on the fly in order to remove or reduce the need for a resin holding tank. More generally, any technique for local thermal activation of a binder may be used in combination with a powder bed of MIM material (and binder) as described herein to form a green body. For example, targeted thermal activation may be achieved with a thermal print head, an IR heating mask and/or lamp, focused microwave energy, selective thermal sintering, steering of an activation beam with a digital light processing chip, a heated roller, or any other technique or combination of techniques. For example, a variety of thermal print heads are commercially available, e.g., from Kyocera and other manufacturers that may be suitably adapted to applying targeted thermal energy to a layer of binder and MIM powder.

SLS with MIM Materials

Figure 5:
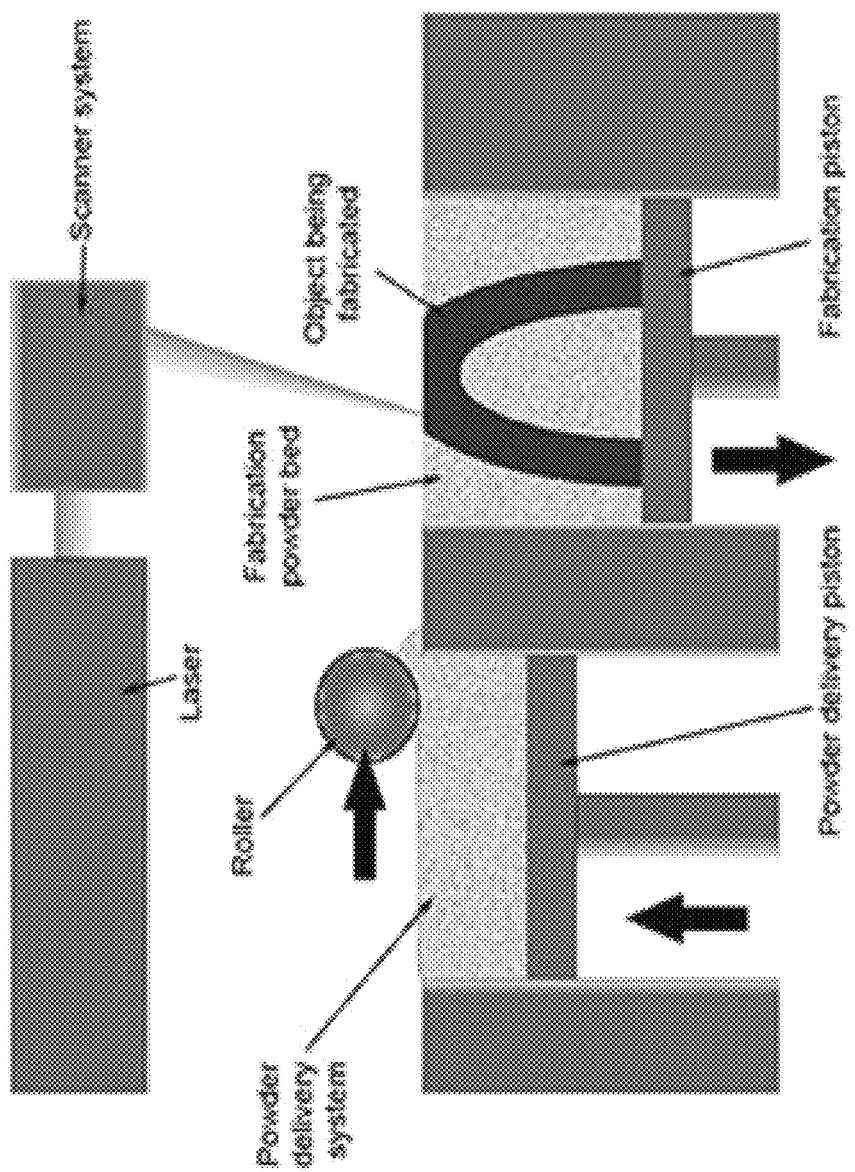
FIG. 5 illustrates a laser binding process for using powder metallurgy materials.

FIG. 5 shows a laser binding process for powder metallurgy materials. In a process comparable to selective laser sintering, a powder/binder mixture may be fed from a powder delivery system to a fabrication bed. The binder may be activated on a layer-by-layer basis using a laser or other activation source to create a low strength bond within the powder for each cross section of a target shape. This activation may form a sufficient bond to retain the powder and binder in a net shape green body that can be removed and sintered using the sintering processes described herein. Suitable binders are available that can be activated using relatively inexpensive, lowpower, fast laser processes or masked IR or UV. This significantly improves upon existing direct metal laser sintering processes that would otherwise require special atmospheric controls and high-power lasers.

Higher energy lasers may be usefully employed, for example, to more fully melt and/or remove binder material and improve the density of the green body before sintering, or to initiate sintering of the metal within the green body. In another aspect, the MIM materials described herein may be adapted for use in a selective laser melting process where the binder melts, rather than sinters, to form a net-shape green body which is then debound and sintered according to the methods described herein.

Figure 6A:
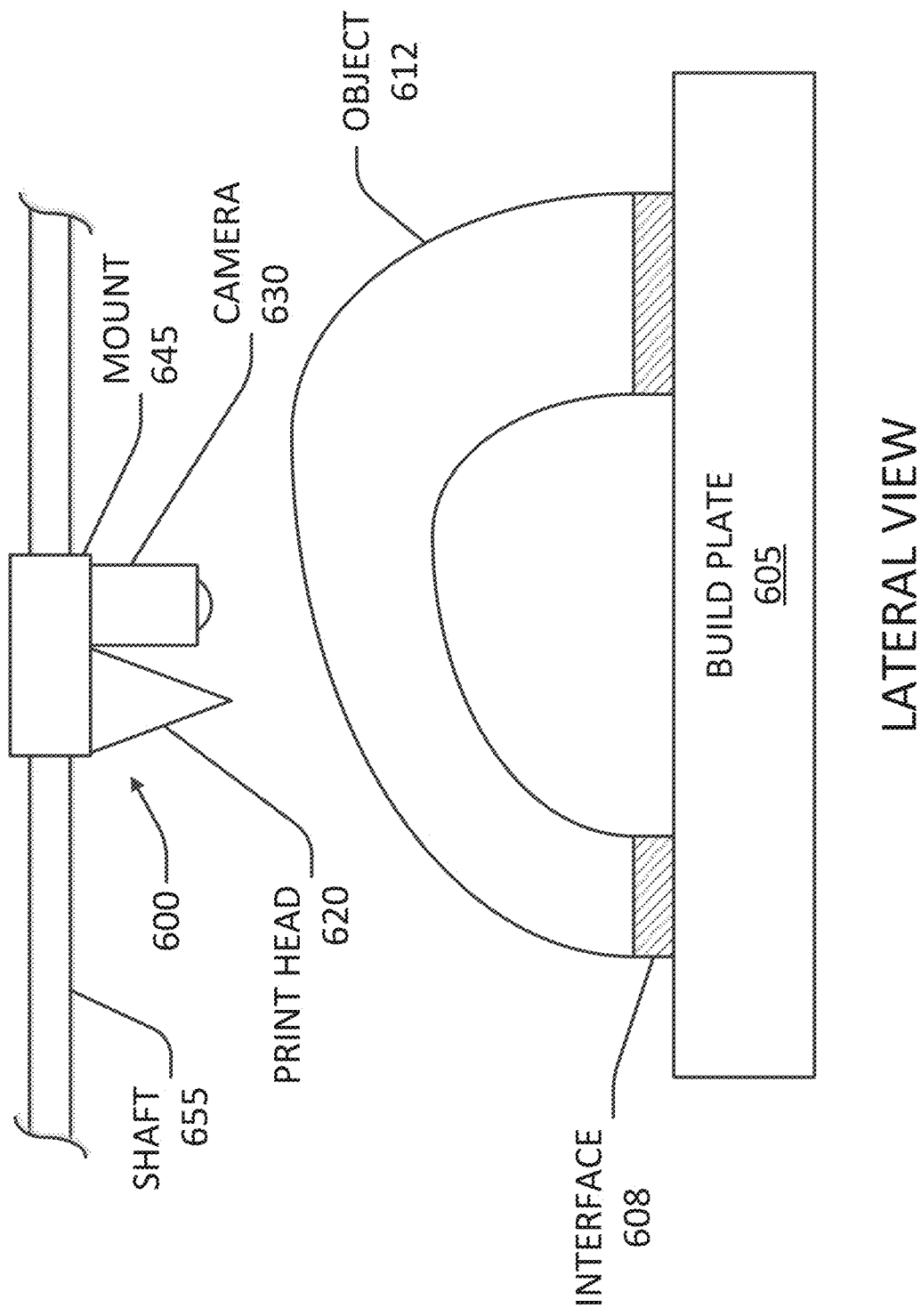
FIGS. 6A-B illustrate camera and print head assembly within a build chamber in one embodiment.
Figure 6B:
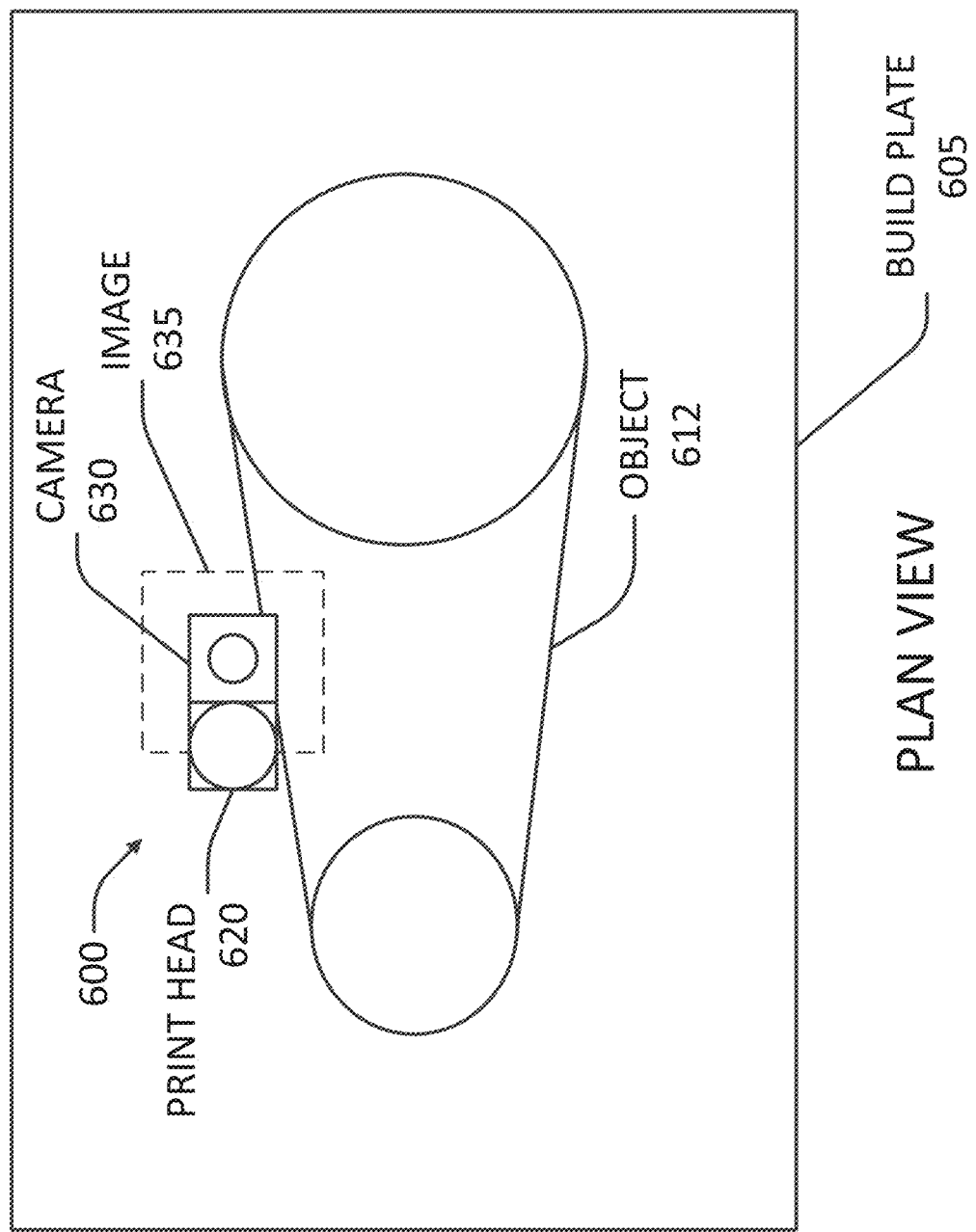

FIGS. 6A-B illustrate camera and print head assembly 600 within a build chamber in one embodiment. FIG. 6A shows a lateral (i.e., cross-sectional) view of the assembly 600 and build plate 605, while FIG. 6B depicts a plan ("top-down") view. The assembly 600 may be implemented in a build chamber of a 3D printer described above with reference to FIGS. 1-5. In particular, the assembly 600 may be a feature of a 3D printer such as the printer 100 described above, and the object 612 and build plate 605 may incorporate one or more features of the object 112, and build plate 114, respectively, as described above with reference to FIG. 1. Prior to or during printing, the geometry of the object 612 may be defined by a three-dimensional model comparable to the model 122 described above with reference to FIG. 1. An interface layer 608 may occupy a layer between the build plate 605 and the base plate 610. The interface layer 608 may include a material that is nonreactive relative to the material comprising the base plate 610, such as a powdered ceramic, thereby facilitating separation of the assembly 600 from the build plate 605 after the printing process is completed. Following printing, the object 612 (as a green part) may undergo further processing as described above, including debinding and sintering, to produce a finished object.

The assembly 600 may include a print head 620, a camera 630, and a mount 645 connecting to a shaft 655 suspending the assembly 600 within the build chamber. A robotic system, such as the robotic system 108 described above with reference to FIG. 1, may operate to move the assembly 600 along the shaft 655, through the space of the build chamber, and along a tool path to print the object 612. The camera 630 may include one or more sensors, including an image sensor, a stereoscopic (i.e., 3D) camera, a distance sensor (e.g., laser or infrared distance sensor), and/or other devices for imaging or measurements. As shown in FIG. 6B, during such operation, the camera 630 may capture an image 635 of scenes below the assembly 600, which can include the object 612 and/or the build plate 605. Further, during a printing operation, when a given layer of the object 612 is being printed via the print head 620, the camera can capture images of the layer concurrently with the printing. As a result, the assembly 600 can capture image data of the object at various stages of the print process. In alternative embodiments, the camera 630 may be implemented separately from the print head 620. For example, the camera 630 may be mounted at a stationary location within the printer, or may be mounted to an assembly connected to a motion system to move independently from the print head 620.

The assembly 600, and image data captured by the camera 630 of the assembly 600, can be applied in several ways to improve the printing of objects by the 3D printer. For example, the assembly 600 can capture image data of the build plate 605, and, based on this image data, correct for any defects or deviations in the build plate 605 when building an object. An example embodiment of such a method is described below with reference to FIGS. 7A-B and 8. Similarly, the assembly 600 can also scan a calibration object, such as a pattern printed on the build plate 605, and implement the corresponding image data to improve the printing of a subsequent object, as described below with reference to FIGS. 9A-B and 10. Further, the assembly 600 can scan successive portions of an object, on a layer-by-layer basis, as the object is being printed. The resulting image data can be implemented to detect any defects in the printed object, and make corresponding corrections to improve the printing of successive objects, as described below with reference to FIGS. 11A-B and 14. In further embodiments, corrections or improvements to a printed object may be made in response to a scan of the object itself, as described below with reference to FIG. 15.

Figure 7A:
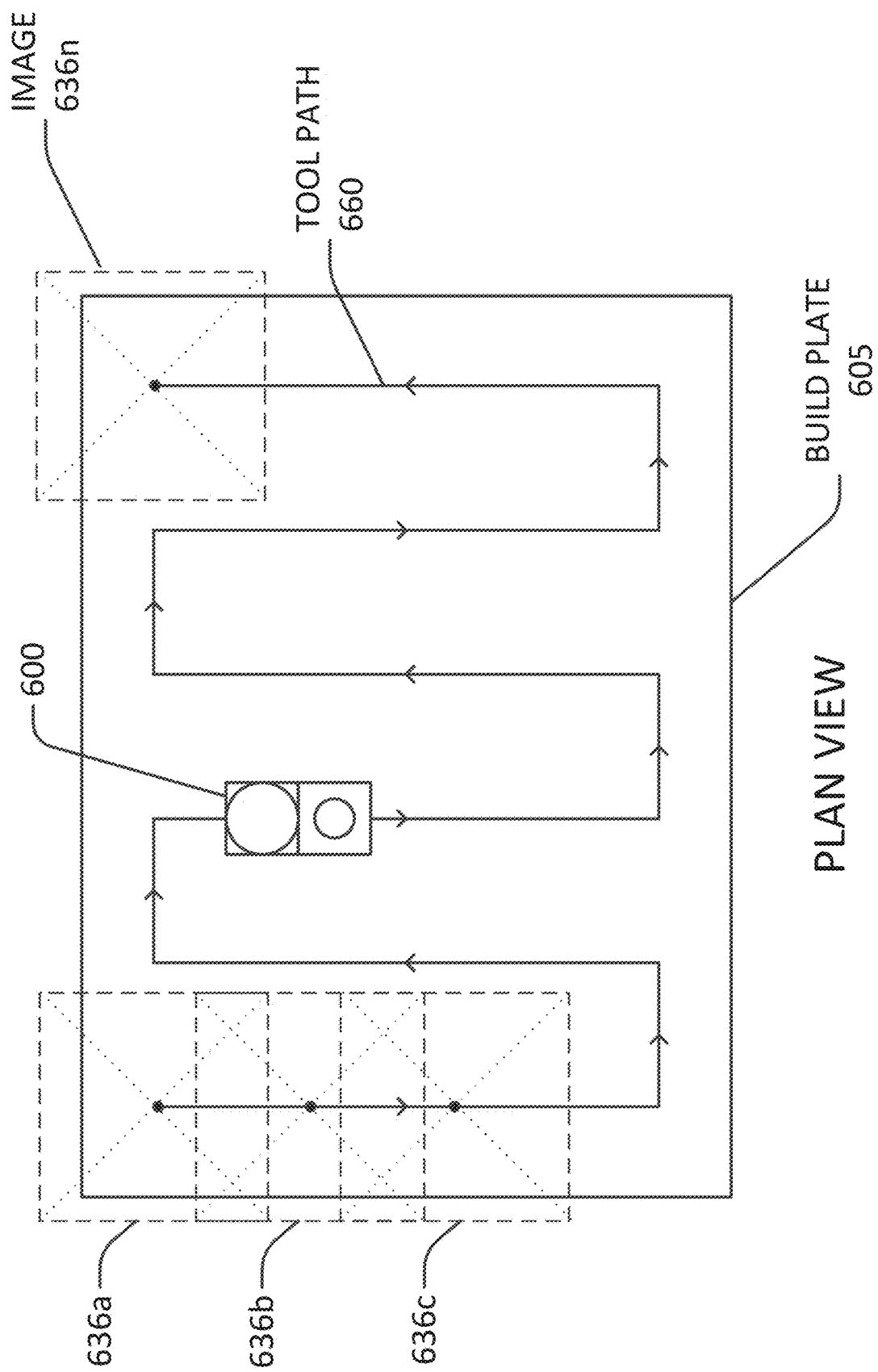

FIGS. 7A-B illustrate a camera and print head assembly 600 during a scan of a build plate 605. As shown in FIG. 6A, the assembly 600 may be moved along a tool path 660 above the surface of the build plate 605, and the assembly 600 captures a plurality of images 636a-n along the tool path 660. The images 636a-n may together capture the entire surface of the build plate 605, as well as an area beyond the build plate 605, or may encompass a subset of the build plate 605 constituting an area on which an object is to be built. Further, each of the images 636a-n may overlap with one or more other images, as shown for example by images 636a-c. Alternatively, the assembly 600 may capture images having overlaps such that every portion of the build plate is captured by at least two images.

The images 636a-n may be implemented in a number of ways to determine information about the build plate 605. For example, the images 636a-n may be "stitched" together to form a single, 2D image at a higher resolution than what would be captured by a single image. In a further application, the overlapping images can provide stereoscopic data about the surface of the build plate 605, enabling a control system (e.g., control system 118 of FIG. 1) to resolve 3D features of the build plate surface. In place of (or in addition to) the use of overlapping images, the assembly 600 may employ a stereoscopic camera to capture multiple, offset images simultanesouly. Using the stereoscopic data, the control system may derive a depth map of the build plate surface, which indicates deviations from a defined plane at a surface of the build plate 605. Alternatively, the assembly 600 may be controlled to capture a single (flat or stereoscopic) image encompassing the entire build plate 605, avoiding the need for stitching of multiple images.

As shown in FIG. 7B, the surface of the build plate 605 may include defects 691, 692 that amount to deviations from a defined plane (e.g., a first build layer) making up the expected work surface. These defects, such as a pit 691 and a warped portion 692, can introduce flaws into the printing of an object due to misplacement of build material at the surface of the build plate 605. By capturing the images 636a-n, a control system can identify these defects 691, 692 and implement measures into a print process to compensate for those defects, resulting an object printed with higher fidelity. As an alternative or supplement to a camera, the assembly 600 may implement a distance sensor (e.g., laser or infrared sensor) to measure the distance (referred to as "Z-dimension" 637) between the assembly 600 and the surface of the build plate 605. In addition to improving the accuracy of a depth map of the surface of the build plate 605, the distance sensor may also be implemented during a calibration process or a printing operation to adjust the height of the assembly 600 above the build plate 605 as a function of the measured Z-dimension 637. The assembly 600 may employ other solutions for determining the Z-dimension 637, such as measuring the width of a beam of light directed at the surface of the build plate 605, or employing a camera with a narrow focus range.

Figure 8:
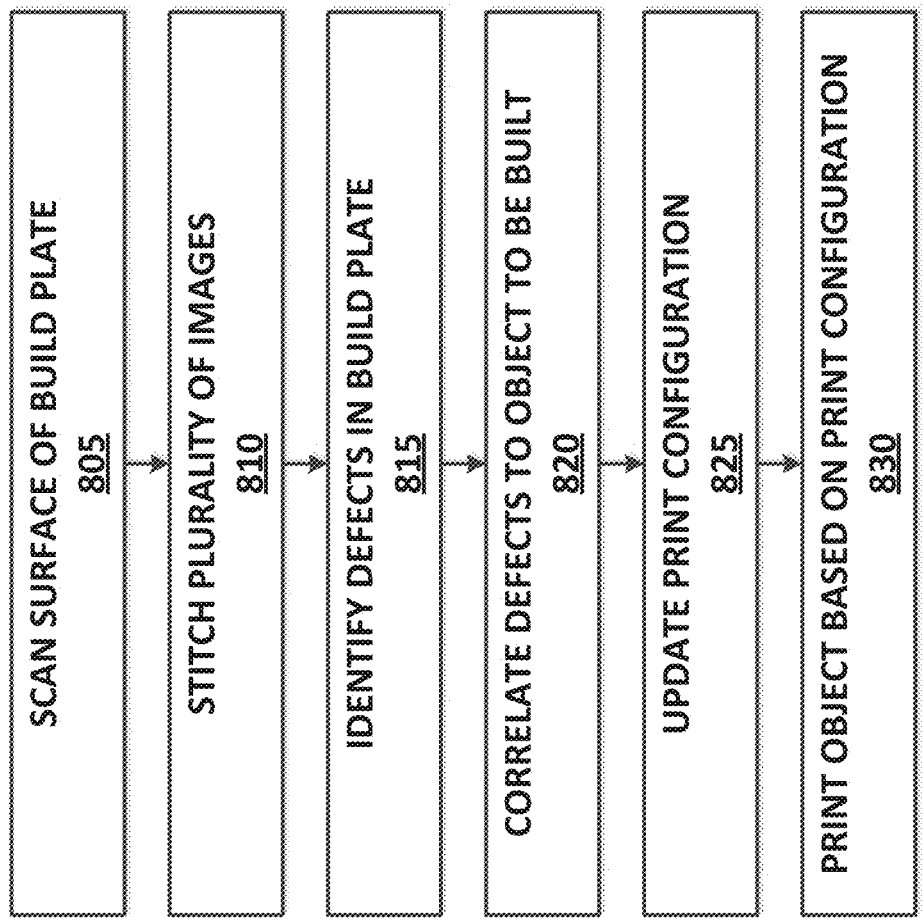
FIG. 8 is a flow diagram of a process of scanning and a surface of a build plate and calibrating a printer based on the scan.

FIG. 8 is a flow diagram of a process of scanning and a surface of a build plate and calibrating a printer based on the scan. The process 800 may be carried out by a printer and associated control system such as the printer 100 and control system 118 described above with reference to FIG. 1, where the printer may implement the assembly 600 of FIGS. 7A-B. With reference to FIGS. 1 and 7A-B, a control system 118 may control the assembly 600 to scan the surface of the build plate 605 (805). For example, the assembly 600 may be moved along the tool path 660 to capture the plurality of images 636a-n. Alternatively, the assembly 600 may capture a single image, or may also obtain distance measurements (e.g., Z-dimension 637) via a component distance sensor. If multiple images are taken, those images 636a-n may be stitched together to form a single, high resolution image (810). Utilizing depth data (from one or more of distance sensor measurements or stereoscopic data from the images), a depth map of the build plate 605 may also be generated, which may indicate the deviations from a defined plane at a surface of the build plate 605 (e.g., by indicating relative depth or Z-dimension 637 at a plurality of points at the build plate 605).

Using the image data and/or depth map, defects 691, 692 may be identified (815). Data regarding those defects 691, 692 may be stored for later reference during printing of an object. In particular, the footprint of an object (i.e., area of contact with the build plate 605) to be built may be compared against the location of the defects (820).

If it is determined that those defects may introduce errors into the object printing, a print configuration may be updated to avoid or compensate for those errors (825). The print configuration may encompass one or more properties and/or configurations defining operation of the printer. For example, the print configuration may define a subset of the build plate 605 as a "work area" on which a footprint of an object may be printed, and another subset as a "restricted area" on which a footprint of an object may not be printed. The print configuration may define a restricted area to encompass the defects 691, 692 in the build plate 605, thereby preventing the assembly 600 from printing any portion of an object at the defects 691, 692. The print configuration may also be updated to modify the location and/or orientation of a reference plane (e.g., a plane in which a layer of an object, such as the first layer, is to be print) to compensate for a slope in the build plate 605. Such a modified plane may be referred to as an offset plane. The configuration of the motion system (e.g., robotics controlling the assembly 600) may also be modified. Further, the print parameters may control material deposition flow rate from the assembly 600, as a function of tool location and the print configuration, to compensate for the defects 691,692 when printing at or proximate to the defects 691, 692. For example, the pit 691 may be filled in by additional feedstock during a printing process, thereby compensating for the defect. The print properties may be maintained as firmware or operational software of the printer. The object may then be printed under the updated print parameters, producing an accurate printed object notwithstanding the defects 691, 692 of the build plate 605.

Alternatively or in addition, print parameters that are specific to the printing of a given object may be modified to compensate for the defects. For example, a model of an object (e.g., the 3D model 122 or digital twin 140 described above with reference to FIG. 1) may be modified to incorporate one or more compensations comparable to those described above, directing the printer to print the object with compensation for the defects 691, 692. For example, the object model may be repositioned or reoriented, or the geometry of the model may be modified (e.g., with portions of greater or lesser feedstock deposition) to compensate for the defects 691, 692 when printing the object, resulting in a printed object with greater fidelity to the original model. As an alternative to modifying an object model, the tool path for a printed object (e.g., a G-code instruction set) may be modified in a comparable manner to incorporate compensations for defects of the build plate 605.

Figure 9A:
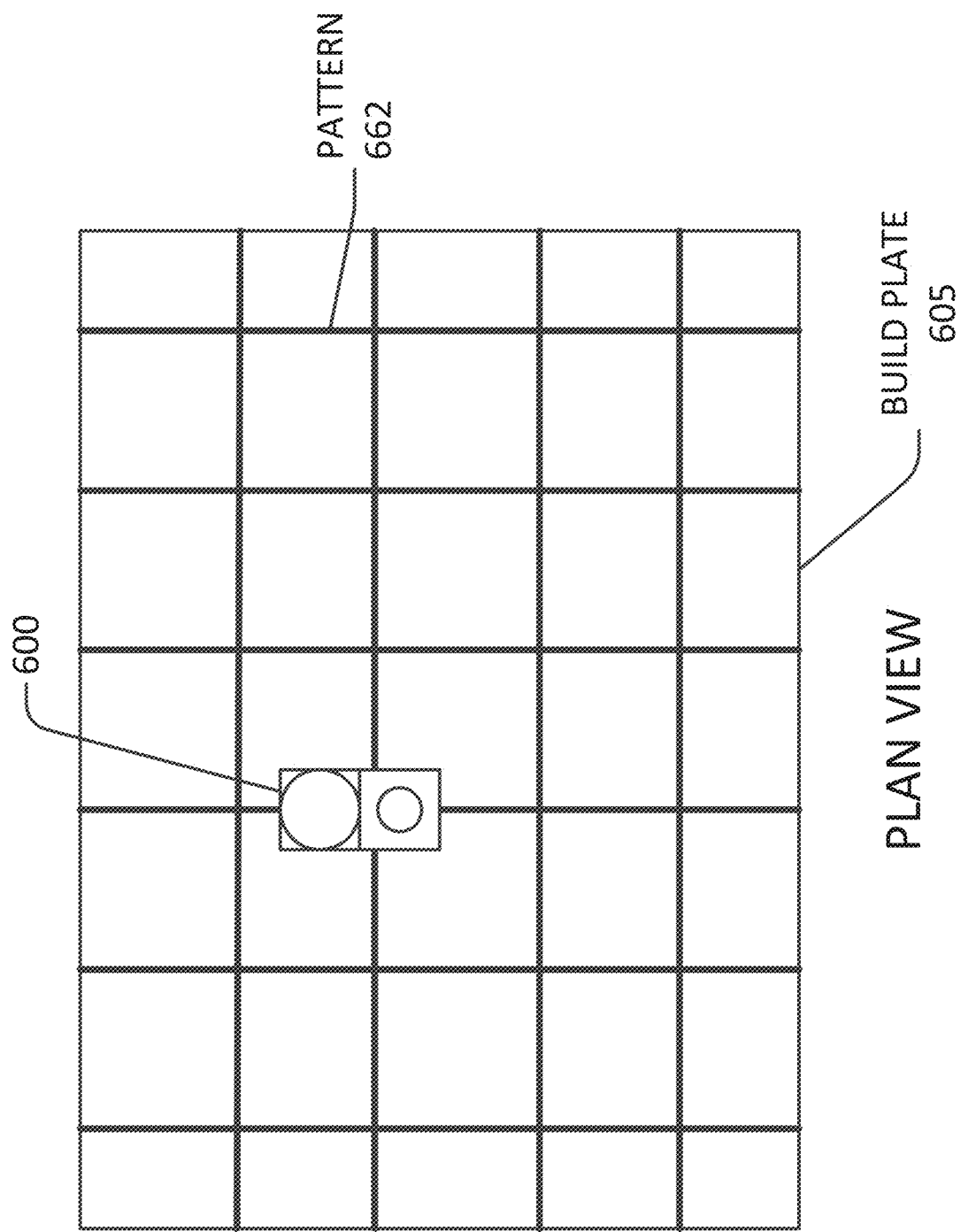

FIGS. 9A-B illustrate a printed calibration pattern 662 on the build plate 605. As an alternative or supplement to scanning the build plate 605 as described above, the printer may control the assembly 600 to print and scan the calibration pattern 662. The assembly 600 may scan and print the calibration pattern 662 concurrently, or may scan the pattern 662 during a subsequent operation, such as a scan of the build plate 605 described above with reference to FIG. 7A.

The pattern 662, as shown in FIG. 9A, includes a plurality of intersecting printed lines. Alternatively, the pattern 662 may form one or more geometric shapes, repeating or otherwise, or may occupy multiple printed layers at and above the build plate 605. Alternatively, the pattern 662 may be printed by more than one different print nozzles or print heads (e.g., via a print head 620 having multiple nozzles, or via multiple independent print heads implemented in a common build chamber). In such an embodiment, the pattern 662 may include parallel or adjacent portions that are printed by two different print heads or nozzles, and a scan of the pattern 662 may indicate whether the two print heads or nozzles are correctly calibrated with respect to one another.

The pattern 662 may be printed from the same feedstock utilized to print an object or supporting structure, or may be printed from a material used for an interface layer (e.g., a ceramic powder occupying a layer adjacent to the object) or other material. To facilitate removal of the pattern 662 following a scan, the assembly 600 may print an interface layer between the pattern 662 and the build plate 605. Alternatively, an interface layer may be applied manually to be build plate 605 prior to printing the pattern 662.

FIG. 9B illustrates the assembly 600 during a concurrent scan and printing of a printed line 672. The printed line 672 may be a segment of the pattern 662 of FIG. 9A, and may be printed along a programmed tool path 660 followed by the assembly 600. During the printing, the printed line may exhibit a deviation 674 from the expected line defined by the tool path 660. The deviation 674 may include printing material outside the expected bounds of the line 672, a gap in the line 672, or another defect. The deviation 674 may indicate a defect in the build plate 605 (e.g., defects 691, 692 of FIG. 7B), and/or may indicate an error in the configuration of the printer, such as the calibration of the motion system or location or orientation of the assembly 600. The assembly 600 scans the printed line 672 to capture an image 637 of the deviation 674. The image 637 may be processed to determine the cause of the deviation and update print parameters as necessary to correct for such defects or errors.

FIG. 10 is a flow diagram of a process 1000 of calibrating a printer based on a printed calibration pattern. The process 1000 may be carried out by a printer and associated control system such as the printer 100 and control system 118 described above with reference to FIG. 1, where the printer may implement the assembly 600 of FIGS. 9A-B. With reference to FIGS. 1 and 9A-B, a control system 118 may control the assembly 600 to print and scan, concurrently, the pattern 662 on the surface of the build plate 605 (1005). During the scan, the assembly 600 may capture an image 637 of defects in the pattern 662, such as the deviation 674. If multiple images are taken, those images may be stitched together to form a single, high resolution image. Utilizing depth data (from one or more of distance sensor measurements or stereoscopic data from the images), a depth map of the build plate 605 may also be generated, which may indicate the deviations from a defined plane at a surface of the build plate 605 (e.g., by indicating relative depth or Z-dimension 637 at a plurality of points at the build plate 605). Further, a positional error vectormap may be produced based on the depiction of the calibration pattern 662.

Using the image data, error vectormap and/or depth map, defects, such as printed deviations from the toolpath, may be identified and compiled (1010). Once compiled, the deviations may be used to update the print configuration (1020), which may include configuration settings independent of a particular object to be printed. Such configuration settings may include those described above with reference to FIG. 8, such as a defined "work area," orientation of a reference plane, configuration of the motion system, and/or material deposition flow rate. Further, data regarding the defects may be stored for later reference during printing of an object, and may be used to modify operations specific to the printing of the object (e.g., print parameters). In particular, the defects may be correlated to the object to be printed (1015), and print parameters may be updated to avoid or compensate for the defects during the printing of the objects (e.g., by repositioning or reorienting the layout of the object within the build chamber). The object may then be printed based on the updated print configuration (1025).

Alternatively or in addition, a model of an object (e.g., the 3D model 122 or digital twin 140 described above with reference to FIG. 1) may be modified to incorporate one or more compensations comparable to those described above, directing the printer to print the object with compensation for the defects determined by the calibration pattern 662. For example, the object model may be repositioned or reoriented, or the geometry of the model may be modified (e.g., with portions of greater or lesser feedstock deposition) to compensate for the deviation 674 when printing the object, resulting in a printed object with greater fidelity to the original model. As an alternative to modifying an object model, the tool path for a printed object (e.g., a G-code instruction set) may be modified in a comparable manner to incorporate compensations for the detected defects.

Figure 11A:
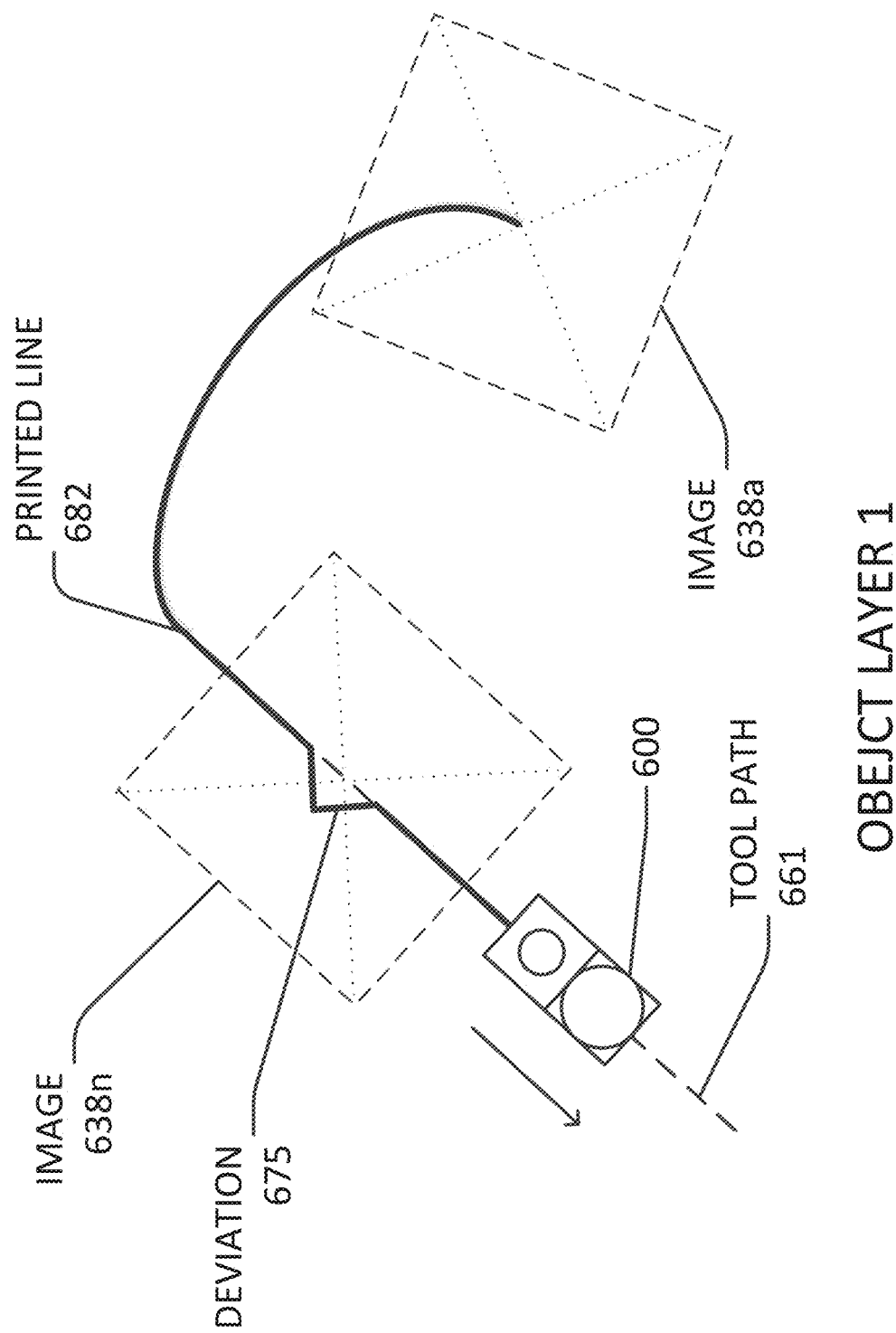
FIGS. 11A-B illustrate a camera and print head assembly during a print of portions of an object.
Figure 11B:
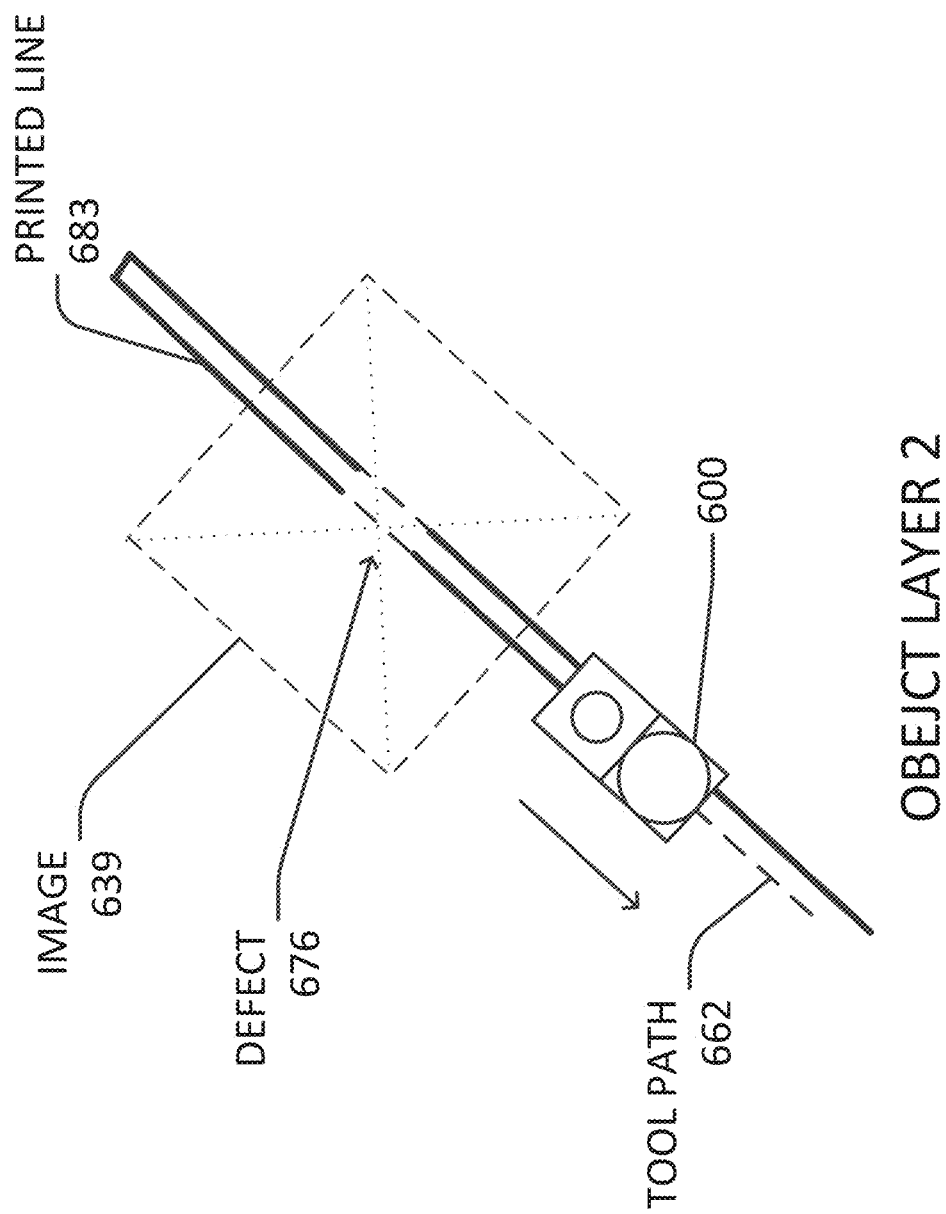

FIGS. 11A-B illustrate a camera and print head assembly during a print of portions of an object. FIG. 11A depicts a plan view of an assembly 600 printing a first layer of an object ("object layer 1"), while FIG. 11B depicts a plan view of the assembly printing a second layer of the object ("object layer 2"). The assembly 600 may be implemented in a build chamber of a 3D printer described above with reference to FIGS. 1-5. In particular, the assembly 600 may be a feature of a 3D printer such as the printer 100 described above, and the printed line 682 may be a portion of an object (e.g., object 612) that may incorporate one or more features of the object 112 as described above with reference to FIG. 1. Prior to or during printing, the geometry of the object may be defined by a three-dimensional model comparable to the model 122 described above with reference to FIG. 1.

At the first object layer shown in part FIG. 11A, the printed line 682 may be a segment of the object being printed, and may be printed along a programmed tool path 661 followed by the assembly 600. During the printing, the printed line 682 may exhibit a deviation 675 from the expected line defined by the tool path 660. The deviation 675 may include any printing result that does not match the print instructed by the tool path 661. The deviation 675 may indicate a defect in the build plate 605 (e.g., defects 691, 692 of FIG. 7B), and/or may indicate an error in the configuration of the printer, such as the calibration of the motion system or location or orientation of the assembly 600. The assembly 600 scans the printed line 682 to capture a series of images 638a-n along the printed line 682, capturing image data of the deviation 675. The image data may be processed to determine the cause of the deviation and update print parameters as necessary to correct for such defects or errors.

The second object layer, shown in part in FIG. 11B, may constitute a further layer of the same object depicted in FIG. 11A, and may be adjacent or non-adjacent to the first object layer. The printed line 683 may be a segment of the object being printed, and may be printed along a programmed tool path 662 followed by the assembly 600. During the printing, the printed line 683 may exhibit a defect 676 from the expected line defined by the tool path 662. The deviation 674 may indicate a defect in the build plate 605, and/or may indicate an error in the configuration of the printer, such as the calibration of the motion system or location or orientation of the assembly 600. The assembly 600 captures an image 639 of the deviation 675. The image data may be processed to determine the cause of the deviation and update print parameters as necessary to correct for such defects or errors.

The defect 676 of the second object layer is depicted as a gap in two adjacent portions of the printed line 683. Such a defect, due to its repetition, may indicate a repeatable (rather than a non-repeatable) error. A repeatable error may be considered to be an error that is likely to occur again during printing of a successive object, or in a successive layer of the same object. A control system may be configured to actuate a reconfiguration in response to detecting a repeated error, while refraining from correcting for errors determined to be non-repeatable. Alternatively, the defect 676 may arise as a length of insufficient deposition of material, which may be indicated by a print line that is narrower than that specified by the tool path. Further, the defect 676 may be indicated by a measured offset between two parallel printed lines, where the offset differs from the printed lines predicted by the tool path.

In addition to the first and second layers of FIGS. 11A-B, the assembly can scan additional layers of an object concurrently with the printing of those layers. Thus, the assembly 600 can scan successive portions of an object, on a layer-by-layer basis, as the object is being printed. The resulting image data can be implemented to detect defects in the printed object, determine whether those defects are repeatable, determine the source of those defects (e.g., a defective build plate, an error in the configuration of the motion system), and make corresponding corrections to improve the printing of successive objects and/or successive layers of the same object.

In further embodiments, images of a plurality of cross-sectional layers of a first object (e.g., the object depicted in FIGS. 11A-B) may be captured concurrently with the printing of the first object. Based on the scan, print parameters may be updated, which may include modifying the geometry of a representation of the object based on deviations between an initial object model and the images of the plurality of cross-sectional layers of the first object. Updating the print parameters may also include generating a correction tool path (e.g., a revised version of tool paths 661, 662) for a print head of the assembly 600 based on the detected deviations. A second object may then be printed by controlling the print head based on the correction tool path. Further, during printing of the second object or successive layers of the first object, material deposition flow rate may be controlled as a function of tool location and the correction tool path. The correction tool path may also be implemented to correct the printing of the first object, by printing an initial portion of the object, and then printing a successive portion of the first object according to the correction tool path. Further updating the print parameters may include generating a correction model of the object, the correction model defining geometry of the object with offsets to the initial model based on the detected deviations. Example methods of such correction are described in further detail below with reference to FIGS. 14 and 15.

Figures 12A, 12B:
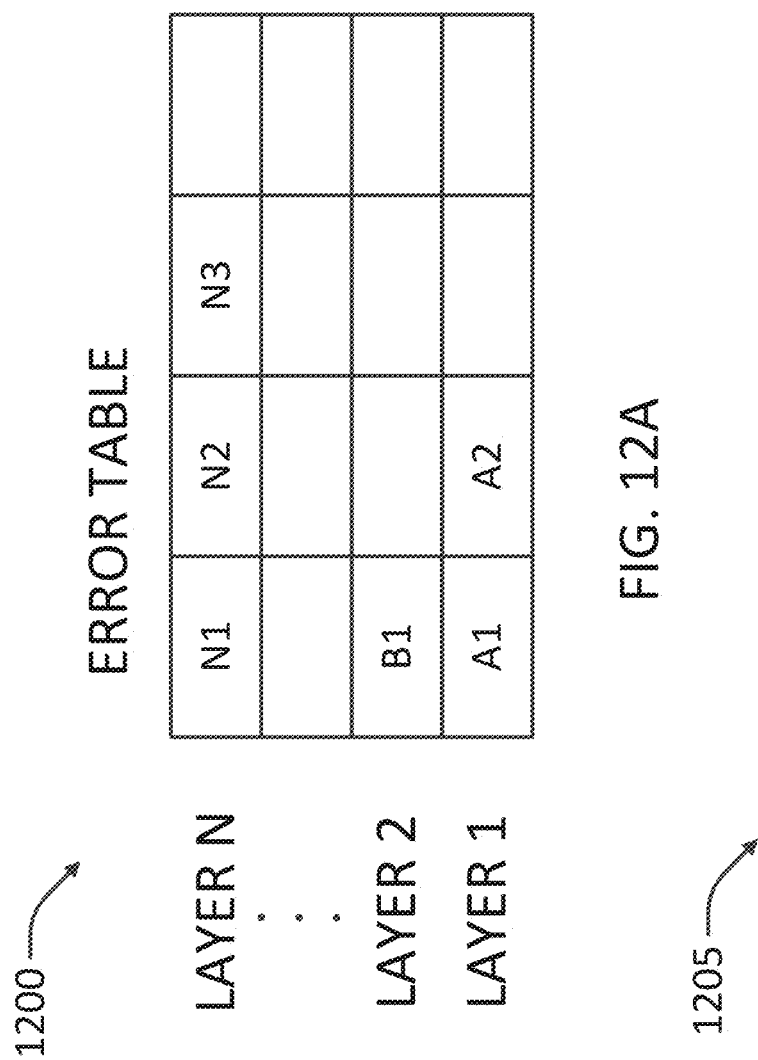
FIGS. 12A-B are block diagrams of error data in one embodiment.

FIGS. 12A-B are block diagrams of error data in one embodiment. FIG. 12A depicts a table 1200 of correction data, while FIG. 12B depicts an example entry 1205 within the table 1200. The table 1200 may be compiled by a printer control system (e.g., system 118 of FIG. 1) during or following the concurrent scanning and printing of an object, such as the processes described above with reference to FIGS. 6A-11B, and each entry (e.g., entry 1205) in the table 1200 may correspond to a detected error (e.g., deviation or defect) in the printed object. The table 1200 may include a plurality of rows, where each row corresponds to a given layer of the printed object (e.g., layers 1-N). Each row may be populated by entries corresponding to the detected error(s) in the printing of the respective layer.

The example entry 1205 includes an address field (ADDR [0,31]) and a descriptor field (DESCR[32,47]). The address field may indicate the location of the error within the layer. The address field may include values to indicate the 3D and/or 2D coordinates of the error (including the bounds or extent of the error), or may express the location as a length along the toolpath for the given layer. The descriptor field may include a plurality of data points regarding the properties of the error. These data points may include an error category (e.g., omission of material, deviation of material from the toolpath, excess material buildup, insufficient deposition of material), and information specific to the error category (e.g., measured dimensions of the deviation from the toolpath). The descriptor may also include a pointer to a portion of stored image data depicting the error, or may include the image data itself.

A control system may process the entries of the table 1200 to determine actions to correct for the errors, such as reconfiguring the motion system of the printer or modifying the toolpath or model corresponding to the object. If the image data is processed further when populating the table 1200, then the descriptor field of an entry 1205 may include further information regarding correction of the error, which can be used to guide the corrective actions. This information may include a prediction regarding whether the error is repeatable, a tag grouping the error with other errors (e.g., by similar location or error type), and/or an indication of the type of remedial action to correct for the error (e.g., modifying the tool path, modifying the material deposition rate).

Figure 13:
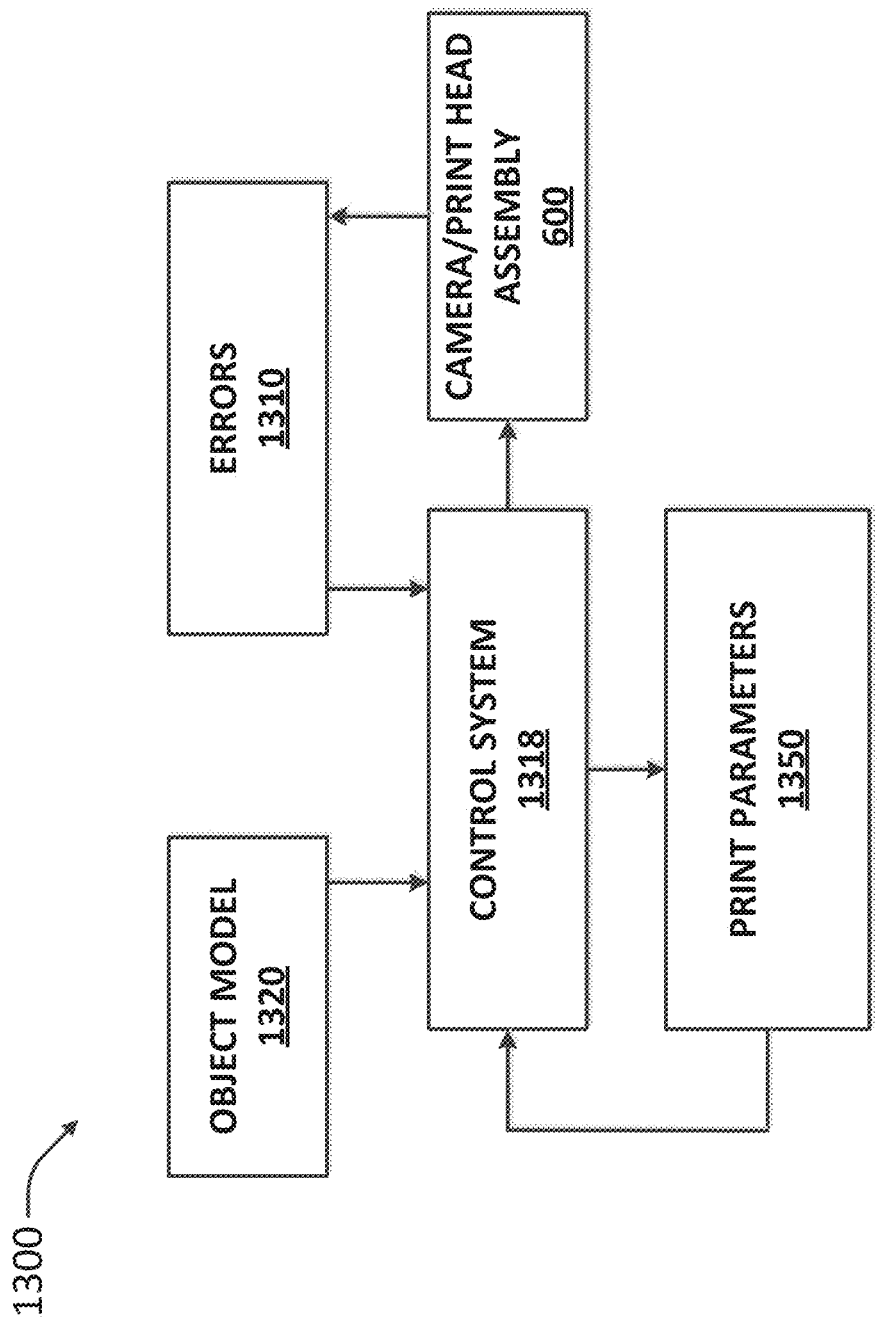
FIG. 13 is a block diagram illustrating generation of print parameters by a control system in one embodiment.

FIG. 13 is a block diagram of a system 1300 for detecting and correcting for errors that may be implemented in a 3D printer. In particular, the system 1300 may be implemented in a 3D printer such as the printers described above with reference to FIGS. 1-5, and may incorporate features described above with reference to FIGS. 6A-12B. The system 1300 may include a control system 1318, which may incorporate features of the control system 118 described above. The control system 1318 controls a camera and print head assembly 600 (which may incorporate features of the assembly 600 described above) to print an object. The print is defined by the object model 1320 (e.g., model 122 of FIG. 1), as well as print parameters 1350, which can include a configuration of the printer, as well as settings specific to the object to be printed, such as a modified version of the object model 1320 (e.g., a "correction model") or a modified tool path. During printing, the assembly 600 captures image data regarding the printing, which can be processed to determine deviations 1310 from the expected print. The deviations may include, for example, an error table 1200 as described above with reference to FIGS. 12A-B. Based on those deviations 1310, the control system 1318 can modify the print parameters 1350 to correct for those deviations during printing of a successive object and/or successive portions of the same object.

Figure 14:
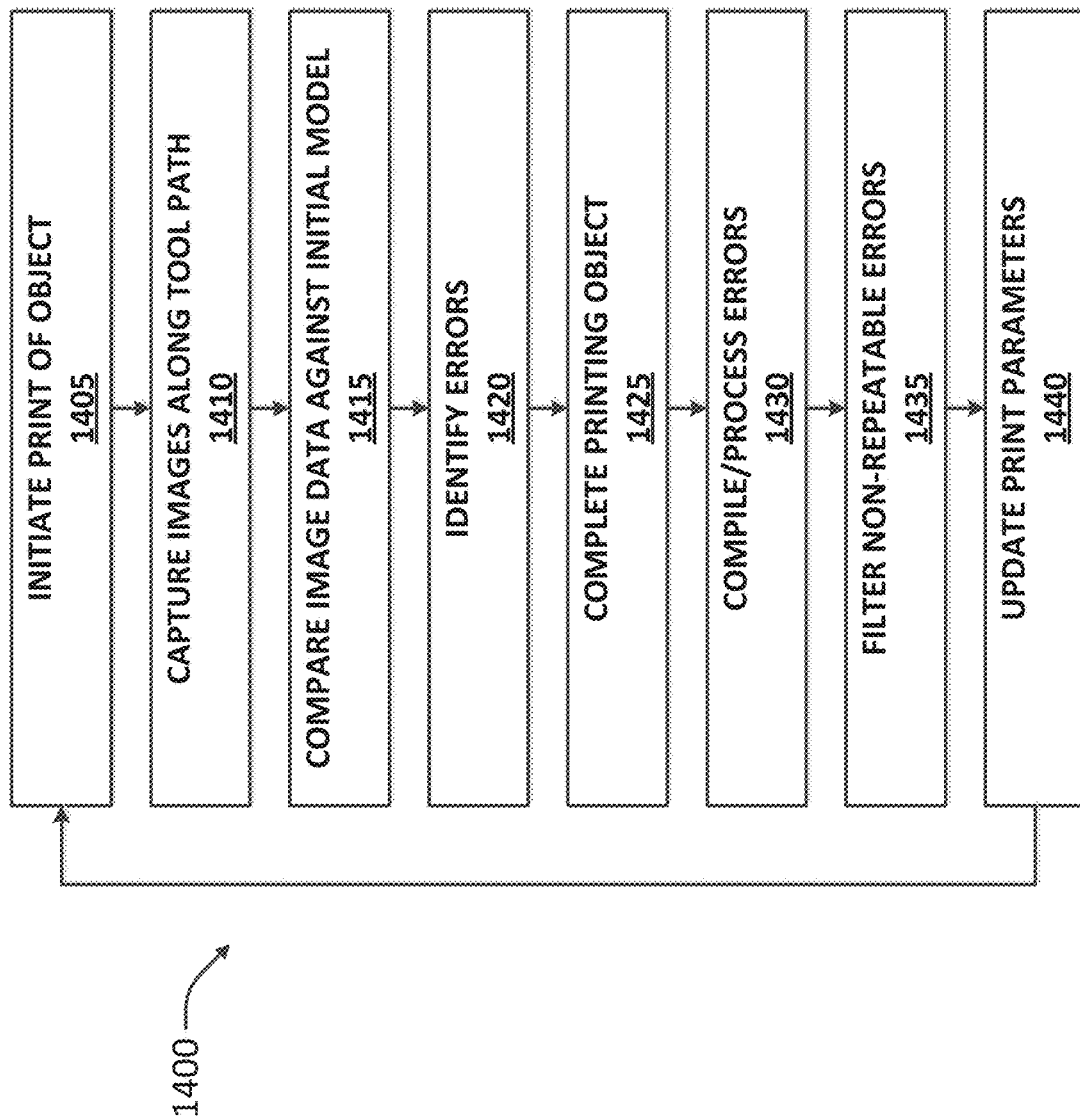
FIG. 14 is a flow diagram of a process of scanning a printed object and calibrating print parameters based on the scan.

FIG. 14 is a flow diagram of a process 1400 of scanning a printed object and calibrating print parameters based on the scan. The process 1400 may be carried out by a printer and associated control system such as the printer 100 and control system 118 described above with reference to FIG. 1, and may incorporate the system 1300 of FIG. 13, as well as the features described above with reference to FIGS. 6A-13. With reference to FIGS. 13 and 11A, a control system 1318 may control the assembly 600 to initiate printing of an object based on an object model 1320 and print parameters 1350 (1405). Concurrently with the printing, the assembly 600 captures images of the printed line 682 along the tool path 661 (1410). Those images may be processed, for example by deriving the coordinates and bounds of the printed line 682, and the relevant image date may be compared against the expected printed line according to the object model 1320 and/or the tool path 661 (1415). If the comparison reveals any errors from the expected printed line (e.g., deviation 675), those errors may be identified (1420).

Following completion of printing the object (1425), the image data may be further processed to compile the errors and determine further information about the errors (1430). For example, the errors may be processed and described above with reference to FIGS. 12A-B, and entries (e.g., entry 1205) may be created for each error and compiled into a table (e.g., table 1200). Optionally, the errors may be filtered by comparison against threshold parameters (e.g., extent or severity of the error) to disregard errors for which corrective action should not be taken (e.g., non-repeatable or insubstantial errors) (1435).

Once the errors are filtered and processed, the control system 1318 may determine updates to the print parameters to correct and/or compensate for the errors (1440). Those updates may include updates to the configuration (e.g., firmware) of the printer, such as a reconfiguration of the motion system of the printer, a change to the material deposition flow rate output by the assembly 600, an offset plane, or other modifications as described above. The updates may also include modifications specific to the object to be printed, such as the generation of (or update to) a correction model or correction toolpath. The correction model may be based on the initial object model 1320 that defines the geometry of the object to be printed, but includes offsets or other modifications to the geometry to correct or compensate for the errors. Likewise, a correction toolpath may provide instructions for controlling movement and deposition of the print head of the assembly 600 during the printing of each layer. The correction toolpath may be implemented for a particular segment (e.g., a given layer) of the object to be printed.

The process 1400 may be implemented as an iterative process for continually improving the printing of objects through a series of successive prints. In particular, following the update to the print parameters (1440), the process 1400 may be repeated once or more for the printing of successive objects, where the print parameters are updated over a plurality of cycles to further improve the fidelity of the printed object. Further, when the process 1400 is repeated, the operation of filtering errors (1435) may account for error data in previous cycles, which can aid in the determination of whether a detected error is repeatable.

FIG. 15 is a flow diagram of a process 1500 of modifying print parameters for an object undergoing a print based on a simultaneous scan of the object. The process 1500 may be carried out by a printer and associated control system such as the printer 100 and control system 118 described above with reference to FIG. 1, and may incorporate the system 1300 of FIG. 13, as well as the features described above with reference to FIGS. 6A-13. Further, the process 1500 may be comparable to the process 1400 described above, with further application to improve the printing of an object based on a concurrent scan of the same object.

With reference to FIGS. 13 and 11A, a control system 1318 may control the assembly 600 to initiate printing of an object based on an object model 1320 and print parameters 1350 (1505). Concurrently with the printing, the assembly 600 captures images of the printed line 682 along the tool path 661 (1510). Those images may be processed, for example by deriving the coordinates and bounds of the printed line 682, and the relevant image date may be compared against the expected printed line according to the object model 1320 and/or the tool path 661 (1515). If the comparison reveals any errors from the expected printed line (e.g., deviation 675), those errors may be identified (1520).

Prior to completion of the printing, the image data gathered for a first portion of the print may be further processed to compile the errors and determine further information about the errors (1530). For example, the errors may be processed and described above with reference to FIGS. 12A-B, and entries (e.g., entry 1205) may be created for each error and compiled into a table (e.g., table 1200). Optionally, the errors may be filtered by comparison against threshold parameters (e.g., extent or severity of the error) to disregard errors for which corrective action should not be taken (e.g., non-repeatable or insubstantial errors) (1535).

Once the errors are filtered and processed, the control system 1318 may determine updates to the print parameters to correct and/or compensate for the errors (1540). Those updates may include updates to the configuration (e.g., firmware) of the printer, and/or updates specific to the object being printed, as described above with reference to FIG. 14. The control system 1318 may then continue printing the object under the updated print parameters, thereby improving the fidelity of a successive portion of the printed object. The process 1500 may be implemented as an iterative process for continually improving the printing of the object. In particular, the process 1500 may be repeated continuously or periodically as a given object is being printed until the print is complete, and the print parameters are updated over a plurality of cycles to further improve the fidelity of the printed object. Further, when the process 1500 is repeated, the operation of filtering errors (1535) may account for error data in previous cycles, which can aid in the determination of whether a detected error is repeatable.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. Further, a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above.

Embodiments described herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

While this invention has been particularly shown and described with references to example embodiments thereof, it will be understood by those skilled in the art that various changes in form and details may be made therein without departing from the scope of the invention encompassed by the appended claims.

What is claimed is:

1. A method for additive manufacturing of metal objects, the method comprising:
    printing a three-dimensional (3D) object on a print surface;
    acquiring image data of the 3D object;
    generating an image of the 3D object;
    comparing at least one of the image data or the image to an initial model of the 3D object;
    determining whether one or more discrepancies exist between the at least one of the image data or the image and the initial model of the 3D object; and
    changing a print configuration for printing the 3D object if the one or more discrepancies exist,
    wherein the printed 3D object is printed from a metal build material, the method further comprising depositing an intermediate layer, including a material different from the metal build material, on a topmost surface of the printed 3D object, and printing a subsequent object on a topmost surface of the intermediate layer.

2. The method according to claim 1, wherein the printed 3D object includes a plurality of intersecting lines or one or more geometric shapes, and wherein the determining if the one or more discrepancies exists includes comparing at least one of (1) the image data or the image of the plurality of intersecting lines or the image data, or (2) the image of the one or more geometric shapes to the initial model of the 3D object.

3. The method according to claim 1, wherein the printed 3D object includes a plurality of parallel lines printed by a plurality of respective printer nozzles, and wherein the determining if the one or more discrepancies exists includes comparing image data or image of the plurality of parallel lines to determine if the lines are parallel.

4. The method according to claim 1, wherein changing the print configuration includes modifying a geometry of the initial model of the 3D object based on the one or more discrepancies between the initial model of the 3D object and the image data or image, or generating an updated tool path based on the one or more discrepancies between the initial model of the 3D object and the image data or the image.

5. The method according to claim 1, wherein the acquiring the image data is concurrently performed with the printing the 3D object.

6. The method according to claim 1, wherein acquiring the image data includes capturing a plurality of scans of the printed 3D object, the method further comprising stitching together the plurality of scans to generate the image of the printed 3D object.

7. The method according to claim 1, wherein after printing the 3D object, the method further comprises:
    printing a subsequent 3D object;
    acquiring image data of the subsequent printed 3D object;
    generating an image of the subsequent 3D object;
    comparing at least one of the image data or the image of the subsequent printed 3D object to the initial model of the 3D object;
    determining whether one or more discrepancies exist between the image data or the image of the subsequent 3D object and the initial model of the subsequent 3D object; and
    changing the print configuration for printing the subsequent 3D object if it is determined the one or more discrepancies exist.

8. The method according to claim 1, further comprising generating a vector map from the image data to determine a positional offset between the initial model of the 3D object and a toolpath of a nozzle used to print the 3D object.

9. A method for additive manufacturing of metal objects, the method comprising:
    scanning a printed object to generate scan data;
    generating a map of the printed object;
    determining whether there is a defect in the printed object;
    changing a print configuration if the printed object includes the defect;
    printing a subsequent object using the changed print configuration;
    scanning a print surface;
    determining if a surface defect exists on the print surface; and
    changing the print configuration if the surface defect exists on the print surface, wherein changing the print configuration further includes one or more of (1) orienting an offset plane of the object to be printed to correspond to an orientation of a plane of the print surface, or (2) selecting an area of the build plate that does not contain the defect on which to print the object, wherein, if the surface defect exists on the print surface, the method further comprises:

printing a metal build material into the surface defect;

depositing an intermediate layer of a second material, different from the metal build material, onto the print surface and the metal build material deposited in the defect; and printing the subsequent object on a surface of the intermediate layer.

10. The method according to claim 9, further comprising: generating print parameters based on an initial model of the printed object and the scan data, wherein the print parameters define a geometry of the subsequent object.

11. The method according to claim 9, further comprising generating image data of the printed object, wherein generating the image data of the printed object comprises stitching together a plurality of scans.

12. The method according to claim 9, wherein changing the print configuration includes modifying a geometry of an initial model of the printed object prior to printing the subsequent object based on one or more discrepancies between the initial model of the printed object and the scan data, or generating an updated tool path based on the discrepancies between the initial model of the printed object and the scan data.

13. The method according to claim 9, wherein the object is printed layer by layer, and wherein the scanning includes scanning each of the plurality of layers.

14. The method according to claim 9, wherein changing the print configuration includes changing at least one of (1) a toolpath of a print head of a printer, or (2) a flow rate of a build material deposited by the print head.

* * * * *